(12) United States Patent
Islam et al.

(10) Patent No.: US 6,374,006 B1
(45) Date of Patent: Apr. 16, 2002

(54) CHIRPED PERIOD GRATINGS FOR RAMAN AMPLIFICATION IN CIRCULATOR LOOP CAVITIES

(75) Inventors: Mohammed N. Islam, Ann Arbor; Michael J. Freeman, Canton, both of MI (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 09/272,451

(22) Filed: Mar. 19, 1999

Related U.S. Application Data
(60) Provisional application No. 60/078,692, filed on Mar. 20, 1998, and provisional application No. 60/129,408, filed on Feb. 12, 1999.

(51) Int. Cl.⁷ .......................... G02B 6/26; H01S 3/067; H01S 3/30
(52) U.S. Cl. .............. 385/15; 385/37; 372/3; 372/6; 372/94; 359/334; 359/341
(58) Field of Search .................. 372/3, 6, 92, 94, 372/96, 98, 99, 102, 108; 359/333, 334, 341; 385/15, 27, 37, 39

(56) References Cited

U.S. PATENT DOCUMENTS

| | | | |
|---|---|---|---|
| 4,063,106 A | 12/1977 | Ashkin et al. | 307/88.3 |
| 4,685,107 A | 8/1987 | Kafka et al. | 372/6 |
| 4,740,974 A | 4/1988 | Byron | 372/3 |
| 4,831,616 A | 5/1989 | Huber | 370/3 |
| 5,039,199 A | 8/1991 | Mollenauer et al. | 359/334 |
| 5,050,183 A | 9/1991 | Duling, III | 372/94 |
| 5,058,974 A | 10/1991 | Mollenauer | 385/27 |
| 5,107,360 A | 4/1992 | Huber | 359/124 |
| 5,117,196 A | 5/1992 | Epworth et al. | 359/333 |
| 5,132,976 A | 7/1992 | Chung et al. | 372/6 |
| 5,134,620 A | 7/1992 | Huber | 372/6 |
| 5,140,456 A | 8/1992 | Huber | 359/341 |
| 5,151,908 A | 9/1992 | Huber | 372/6 |
| 5,153,762 A | 10/1992 | Huber | 359/125 |
| 5,159,601 A | 10/1992 | Huber | 372/6 |
| 5,166,821 A | 11/1992 | Huber | 359/238 |

(List continued on next page.)

FOREIGN PATENT DOCUMENTS

| | | | |
|---|---|---|---|
| EP | 0 903 876 A1 | 3/1999 | H04B/10/17 |
| EP | 0 936 761 A1 | 8/1999 | H04B/10/18 |
| WO | WO 98/20587 | 5/1998 | H01S/3/30 |

OTHER PUBLICATIONS

Sun, Y. et al., "80nm Ultra–Wideband Erbium–Doped Silicia Fibre Amplifier" Electronics Letters, Nov. 6, 1997, vol. 33, No. 23, pp. 1965–1967.

Wysocki, P.F. et al., "Broad–Band Erbium–Doped Fiber Amplifier Flattened Beyond 40nm Using Long–Period Grating Filter", IEEE Photonics, vol. 9, No. 10, Oct. 10, 1997, pp. 1343–1345.

Liaw, S–K et al., "Passive Gain Equilized Wide–Band Erbium–Doped Fiber Amplifier Using Samarium–Doped Fiber", IEEE Photonics Technology: Letters, vol. 8, No. 7, Jul. 7, 1996, pp. 879–881.

(List continued on next page.)

Primary Examiner—John D. Lee
(74) Attorney, Agent, or Firm—Wilson Sonsini Goodrich & Rosati

(57) ABSTRACT

The present invention provides a structure for Raman amplification of signals with counter-propagation of signal and pump and wavelength control while permitting broad bandwidth within each Raman order. The broadband optical amplifier of the invention combines Raman amplification with a circulator loop cavity and/or chirped Bragg gratings to achieve bandwidth performance improvements. The beneficial properties of the circulator loop cavity and/or chirped Bragg gratings can also combined with noise dampening property of the Sagnac Raman cavity.

80 Claims, 22 Drawing Sheets

U.S. PATENT DOCUMENTS

| | | | |
|---|---|---|---|
| 5,187,760 A | 2/1993 | Huber | 385/37 |
| 5,191,586 A | 3/1993 | Huber | 372/6 |
| 5,191,628 A | 3/1993 | Byron | 385/27 |
| 5,200,964 A | 4/1993 | Huber | 372/26 |
| 5,208,819 A | 5/1993 | Huber | 372/32 |
| 5,210,631 A | 5/1993 | Huber et al. | 359/132 |
| 5,212,579 A | 5/1993 | Huber et al. | 359/182 |
| 5,218,655 A | 6/1993 | Mizrahi | 385/39 |
| 5,222,089 A | 6/1993 | Huber | 372/26 |
| 5,225,925 A | 7/1993 | Grubb et al. | 359/341 |
| 5,226,049 A | 7/1993 | Grubb | 372/6 |
| 5,243,609 A | 9/1993 | Huber | 372/19 |
| 5,257,124 A | 10/1993 | Glaab et al. | 359/124 |
| 5,268,910 A | 12/1993 | Huber | 372/6 |
| 5,271,024 A | 12/1993 | Huber | 372/6 |
| 5,283,686 A | 2/1994 | Huber | 359/337 |
| 5,293,545 A | 3/1994 | Huber | 359/111 |
| 5,295,016 A | 3/1994 | Van Deventer | 359/347 |
| 5,295,209 A * | 3/1994 | Huber | 385/37 |
| 5,301,054 A | 4/1994 | Huber et al. | 359/132 |
| 5,321,543 A | 6/1994 | Huber | 359/187 |
| 5,321,707 A | 6/1994 | Huber | 372/6 |
| 5,323,404 A | 6/1994 | Grubb | 372/6 |
| 5,331,449 A | 7/1994 | Huber et al. | 359/125 |
| 5,359,612 A | 10/1994 | Dennis et al. | 372/18 |
| 5,373,389 A | 12/1994 | Huber | 359/195 |
| 5,389,779 A | 2/1995 | Betzig et al. | 250/216 |
| 5,400,166 A | 3/1995 | Huber | 359/173 |
| 5,416,629 A | 5/1995 | Huber | 359/182 |
| 5,450,427 A | 9/1995 | Fermann et al. | 372/18 |
| 5,467,212 A | 11/1995 | Huber | 359/168 |
| 5,473,622 A | 12/1995 | Grubb | 372/6 |
| 5,477,555 A | 12/1995 | Debeau et al. | 372/25 |
| 5,479,291 A | 12/1995 | Smith et al. | 359/333 |
| 5,485,481 A | 1/1996 | Ventrudo et al. | 372/6 |
| 5,497,386 A | 3/1996 | Fontana | 372/18 |
| 5,504,609 A | 4/1996 | Alexander et al. | 359/125 |
| 5,504,771 A | 4/1996 | Vahala et al. | 372/94 |
| 5,513,194 A | 4/1996 | Tamura et al. | 372/6 |
| 5,521,738 A | 5/1996 | Froberg et al. | 359/184 |
| 5,530,710 A | 6/1996 | Grubb | 372/6 |
| 5,532,864 A | 7/1996 | Alexander et al. | 359/177 |
| 5,541,947 A | 7/1996 | Mourou et al. | 372/25 |
| 5,542,011 A | 7/1996 | Robinson | 385/24 |
| 5,555,118 A | 9/1996 | Huber | 359/125 |
| 5,557,442 A | 9/1996 | Huber | 359/179 |
| 5,577,057 A | 11/1996 | Frisken | 372/18 |
| 5,579,143 A | 11/1996 | Huber | 359/130 |
| 5,600,473 A | 2/1997 | Huber | 359/179 |
| 5,617,434 A | 4/1997 | Tamura et al. | 372/6 |
| 5,623,508 A * | 4/1997 | Grubb et al. | 372/3 |
| 5,659,351 A | 8/1997 | Huber | 348/7 |
| 5,659,559 A | 8/1997 | Ventrudo et al. | 372/6 |
| 5,659,644 A | 8/1997 | DiGiovanni et al. | 385/31 |
| 5,673,280 A | 9/1997 | Grubb et al. | 372/3 |
| 5,673,281 A | 9/1997 | Byer | 372/3 |
| 5,701,186 A | 12/1997 | Huber | 359/125 |
| 5,726,784 A | 3/1998 | Alexander et al. | 359/125 |
| 5,734,665 A | 3/1998 | Jeon et al. | 372/6 |
| 5,757,541 A | 5/1998 | Fidric | 359/341 |
| 5,768,012 A | 6/1998 | Zanoni et al. | 359/341 |
| 5,798,855 A | 8/1998 | Alexander et al. | 359/177 |
| 5,815,518 A * | 9/1998 | Reed et al. | 372/6 |
| 5,825,520 A | 10/1998 | Huber | 359/130 |
| 5,838,700 A | 11/1998 | Dianov et al. | 372/6 |
| 5,841,797 A | 11/1998 | Ventrudo et al. | 372/6 |
| 5,847,862 A | 12/1998 | Chraplyvy et al. | 359/337 |
| 5,861,981 A | 1/1999 | Jabr | 359/341 |
| 5,878,071 A * | 3/1999 | Delavaux | 372/94 |
| 5,880,866 A | 3/1999 | Stolen | 359/138 |
| 5,883,736 A | 3/1999 | Oshima et al. | 359/341 |
| 5,887,093 A | 3/1999 | Hansen et al. | 385/27 |
| 5,920,423 A | 7/1999 | Grubb et al. | 359/341 |
| 6,229,828 B1 * | 5/2001 | Sanders et al. | 372/6 X |

OTHER PUBLICATIONS

Yamada, M. et al., "A Low–Noise and Gain Flattened Amplifier Composed of a Silica–Based and a Fluoride–Based Er3+–Doped Fiber Amplifierin a Cascade Configuration", IEEE Photonics Letters, vol. 8, No. 5, May 1996, pp. 620–622.

Ma, M.X. et al., "240–km Repeater Spacing in a 5280–km WDM System Experiment Using 8x2.5 Gb/s NRZ Transmission", IEEE Photonics Technology Letters, vol. 10, No. 6, Jun. 1998, pp. 893–895.

Masuda, H. et al., "Ultrawide 75–nm 3–dB Gain–Band Amplification with Erbium–Doped Fluoride Fiber Amplifiers and Distrbuted Raman Amplifiers", IEEE Photonics Technology Letters, vol. 10, No. 4, Apr. 1998, pp. 516–518.

Masuda, H. et al., "Wide–Band and Gain Flattened Hybrid Fiber Amplifier Consisting of an EDFA and a Multiwavelength Pumped Raman Amplifier", IEEE Photonics Technology Letters, vol. 11, No. 6, Jun. 1999, pp. 647–649.

Kawaii, S. et al., "Ultra–Wide, 75nm 3dB Gain–Based Optical Amplifier Utilising Gain–Flattened Erbium–Doped Fluoride Fibre Amplifier and Discrete Raman Amplification", Electronic Letters, vol. 34, No. 9, Apr. 30, 1998, pp. 897–898.

Kawai, S. et al., "Ultrawide, 75nm 3dB Gain–Band Optical Amplifier Utilizing Erbium–Doped Fluoride Fiber and Raman Fiber", OFC Technical Digest, 1998, paper TuG3.

Kidorf, H. et al., "Pump Interactions in a 100–nm Bandwidth Raman Amplifier", IEEE Electronics Technology Letters, vol. 11, No. 5, May 1999, pp.530–532.

Ono, H. et al., "Gain–Flattened Er3+–Doped Fiber Amplifier for a WDM Signal in the 1.57–1.60–$\mu$m Wavelength Region", IEEE Photonics Technology Letters, vol. 9, No. 5, May 1997, pp. 596–598.

Hansen, P.B. et al., "529km Unrepeatered Transmission at 2.488 Gbit/s Using Dispersion Compensation, Forward Error Correction, and Remote Post– and Pre–amplifiers Pumped By Diode–Pumped Raman Lasers", IEEE Electronics Letters Online No. 19951043, Jul. 7, 1998.

Guy, M.J. et al., "Lossless Transmission of 2ps Pulses Over 45km of Standard Fibre at 1.3 $\mu$m Using Distributed Raman Amplification", Electronics Letters, vol. 34, No. 8, Apr. 16, 1998, pp. 793–794.

Dianov, E.M. et al., "Highly Efficient 1.3 $\mu$m Raman Fibre amplifier", Electronics Letters, vol. 34, No. 7, Apr. 2, 1998, pp. 669–670.

Chernikov, S.V. et al., "Raman Fibre Laser Operating at 1.24 $\mu$m", Electronics Letters, vol. 34, No. 7, Apr. 2, 1998, pp. 680–681.

Liaw, S–K et al., "Passive Gain–Equilized Wide–Band Erbium–Doped Fiber Amplifier Using Sumarium–Doped Fiber", IEEE Photonics Technology Letters, vol. 8, No. 7, Jul. 1996, pp. 879–881.

Masuda, M. et al., "Wideband, Gain–Flattened, Erbium–Doped Fibre Amplifiers with 3dB Bandwidths of >50nm", Electronics Letters, vol. 33, No. 12, Jul. 5, 1997, pp. 1070–1072.

Yang, F.S. et al., "Demonstration of Two–Pump Fibre Optical Parametric Amplification", Electronics Letters, vol. 33, No. 21, Oct. 9, 1997, pp. 1812–1813.

Kawai, S. et al., "Wide–Bandwidth and Long–Distance WDM Transmission Using Highly Gain–Flattened Hybrid Amplifier", IEEE Photonics Technology Letters, vol. 11, No. 7, Jul. 1999, pp. 886–888.

Paschotta, R. et al., "Ytterbium–Doped Fiber Amplifiers", IEEE Journal of Quantum Electronics, vol. 33, No. 7, Jul. 1997, pp. 1049–1056.

Chernikov, S.V. et al., "Raman Fibre Laser Operating at 1.24 $\mu$m" Electronics Letters, vol. 34, No. 7, Apr. 2, 1998, pp. 680–681.

Grubb, S.G. et al., "Fiber Raman Lasers Emit at Many Wavelengths", Laser Focus World, Feb. 1996, pp. 127–134.

Mollenauer, L.F. et al., "Dispersion–Managed Solitons for Terrestrial Transmission", Optical Society of America, 1999, 3 pp.

Hansen, S. L. et al., "Gain Limit in Erbium–Doped Fiber Amplifiers Due to Internal Rayleigh Backscattering", IEEE Photonics Technology Letters, vol. 4, No. 6, Jun. 1992, pp. 559–561.

Spirit, D.M. et al., "Systems Aspects of Raman Fibre Amplifiers", Optical Amplifiers for Communication, vol. 137, Pt. J, No. 4, Aug. 1990, pp. 221–224.

Mollenenauer, L.F. et al., "Soliton Propagation in Long Fibers with Periodically Compensated Loss", IEEE Journal of Quantum Electronics, vol. QE–22, No. 1, Jan. 1986, pp. 157–173.

Marhic, M.E. et al., "Cancellation of Stimulated–Raman–Scattering Cross Talk in Wavelength–Division–Multiplexed Optical Communication Systems by Series or Parallel Techniques", Optical Society of America, 1998, vol. 15, No. 3, pp. 957–963.

Hansen, P.B. et al., "Rayleigh Scattering Limitations in distrigbuted Raman Pre–Amplifiers", IEEE Photonics Technology Letters, vol. 10, No. 1, Jan. 1998, pp. 159–161.

Ikeda, M., "Stimulated Raman Amplification Characteristics in Long Span Single–Mode Silica Fibers", Optics Communications, vol. 39, No. 3, 1981, pp. 148–152, Oct. 1981.

Chraplyvy, A.R. et al., "Performance Degradation Due to Stimulated Raman Scattering in Wavelength–Division–Multiplexed Optical–Fibre Systems", Electronics Letters, vol. 19, No. 16, Aug. 4, 1983, pp. 641–643.

Grandpierre, A.G. et al., "Theory of Stimulated Raman Scattering Cancellation in Wavelength–Division–Multiplexed Systems via Spectral Inversion", IEEE Photonics Technology Letters, vol. 11, No. 10, Oct. 1999, pp. 1271–1273.

Chinn, S.R. "Analysis of Counter–Pumped Small–Signal Fibre Raman Amplifiers", Electronics Lettters, vol. 33, No. 7, Mar. 27, 1997, pp. 607–608.

Stolen, R.H. et al., "Raman Gain in Glass Optical Waveguides", Appl. Phys. Lett. vol. 22, No. 6, Mar. 15, 1973, pp. 276–278.

Stolen, R.H. et al., "Development of the Stimulated Raman Spectrum in Single–Mode Silica Fibers", Optical Society of America, vol. 1, No. 4, Aug. 1984, pp. 662–667.

Nissov, M. et al., "100 Gb/s (10x10Gb/s) WDM Transmission over 7200 km Using Distributed Raman Amplification", Center for Broadband Telecommunications, pp. 9–12, no date!

Takachio, N. et al., "32x10Gb/s Distributed Raman Amplification Transmission with 50–GHz Channel Spacing in the Zero–Dispersion Region over 640 km of 1.55–$\mu$m Dispersion–shifted Fiber", NTT Labs, OFC99, 1999.

* cited by examiner

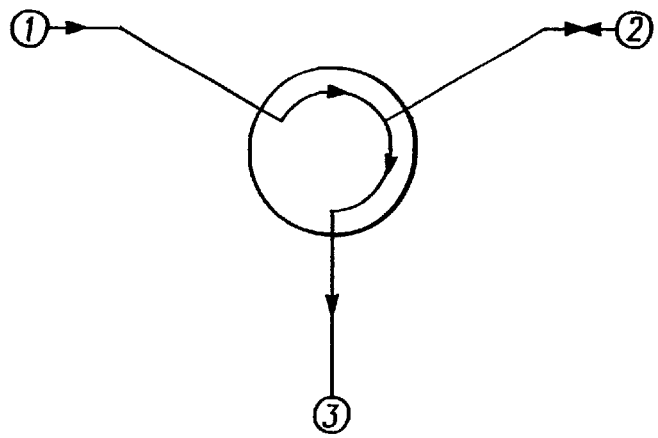
(PRIOR ART)
FIG.—2
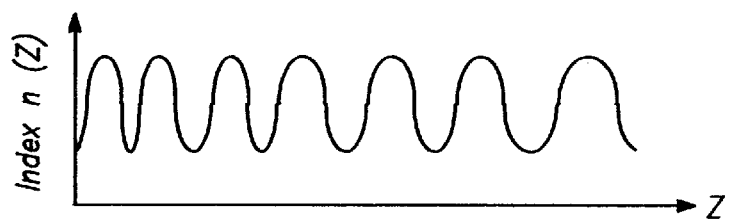
(PRIOR ART)
FIG.—3a
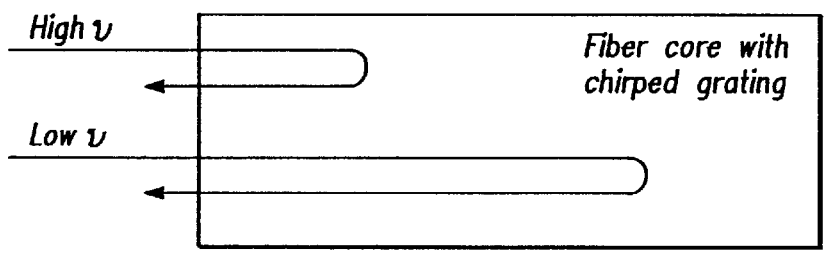
(PRIOR ART)
FIG.—3b

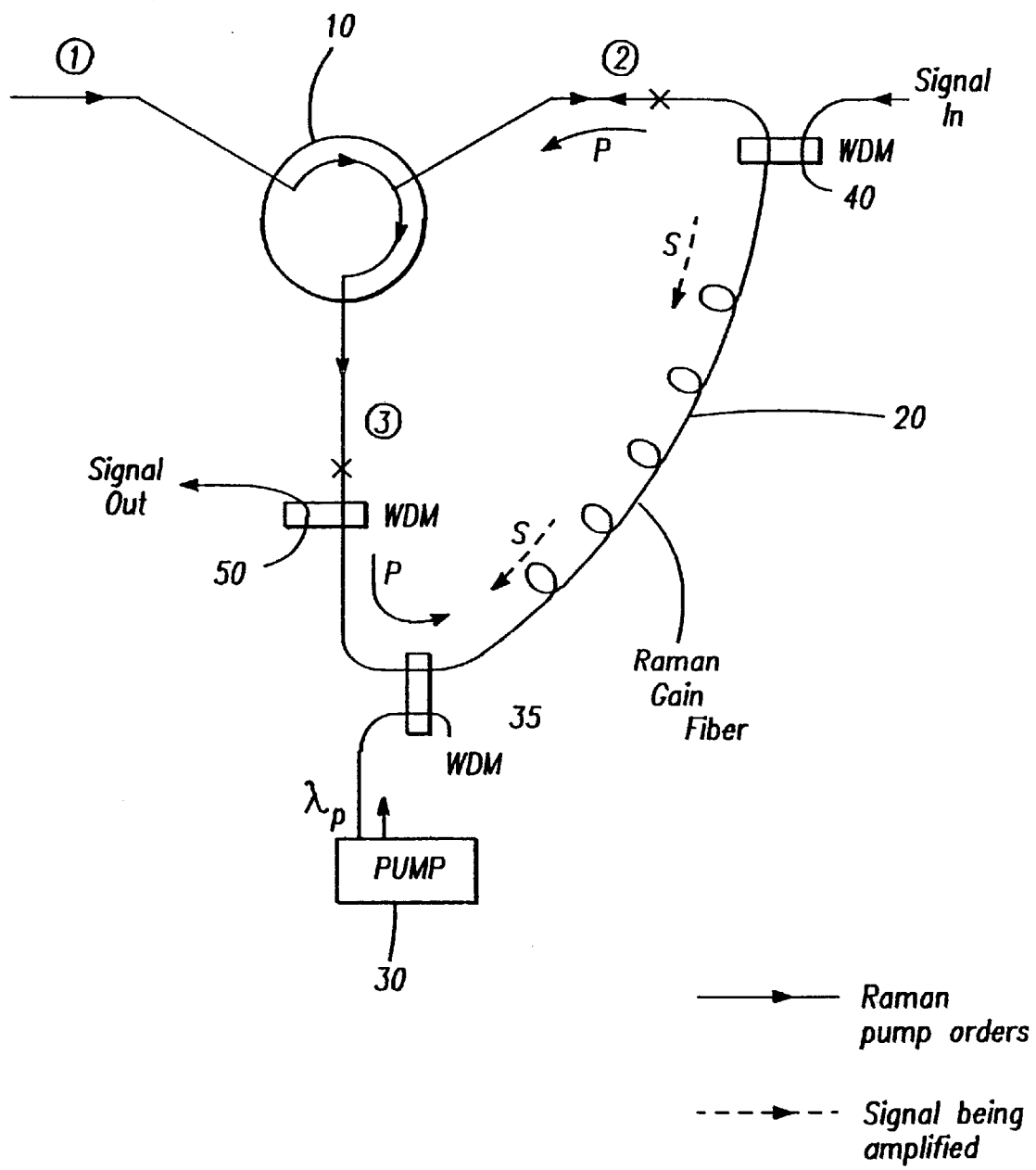
FIG.—4a

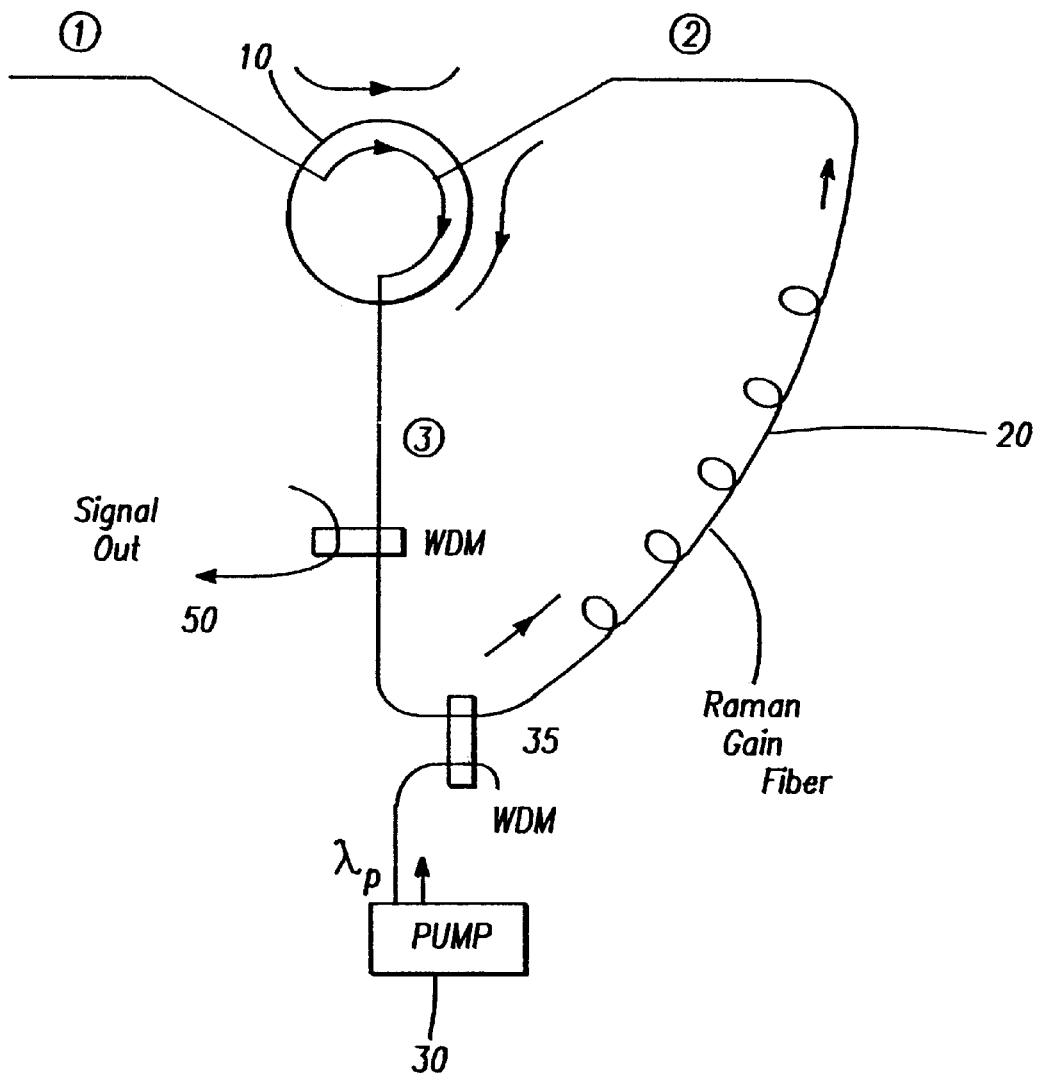
FIG.—4b

Cavity for Raman orders below
Signal Wavelength
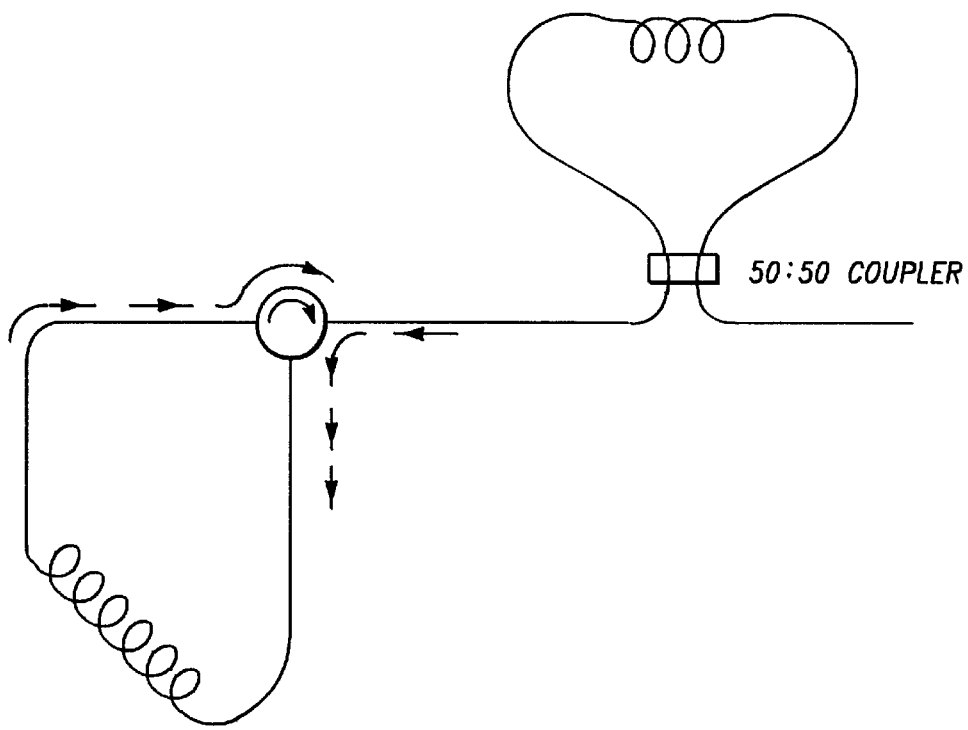
FIG.—6a
Cavity for Signal Wavelength
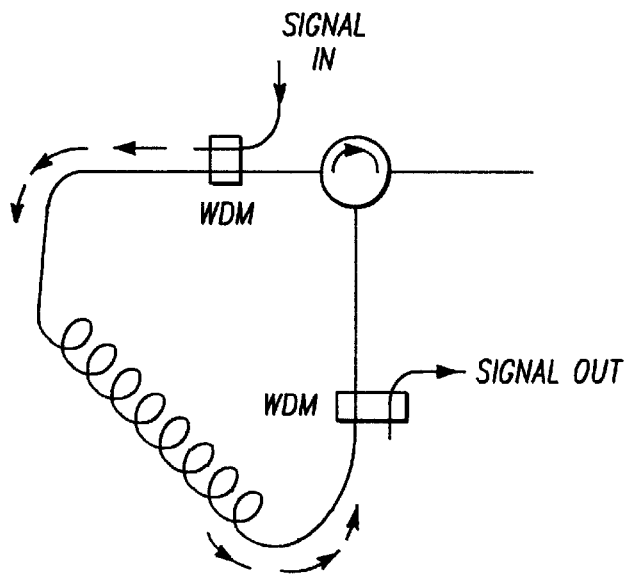
FIG.—6b

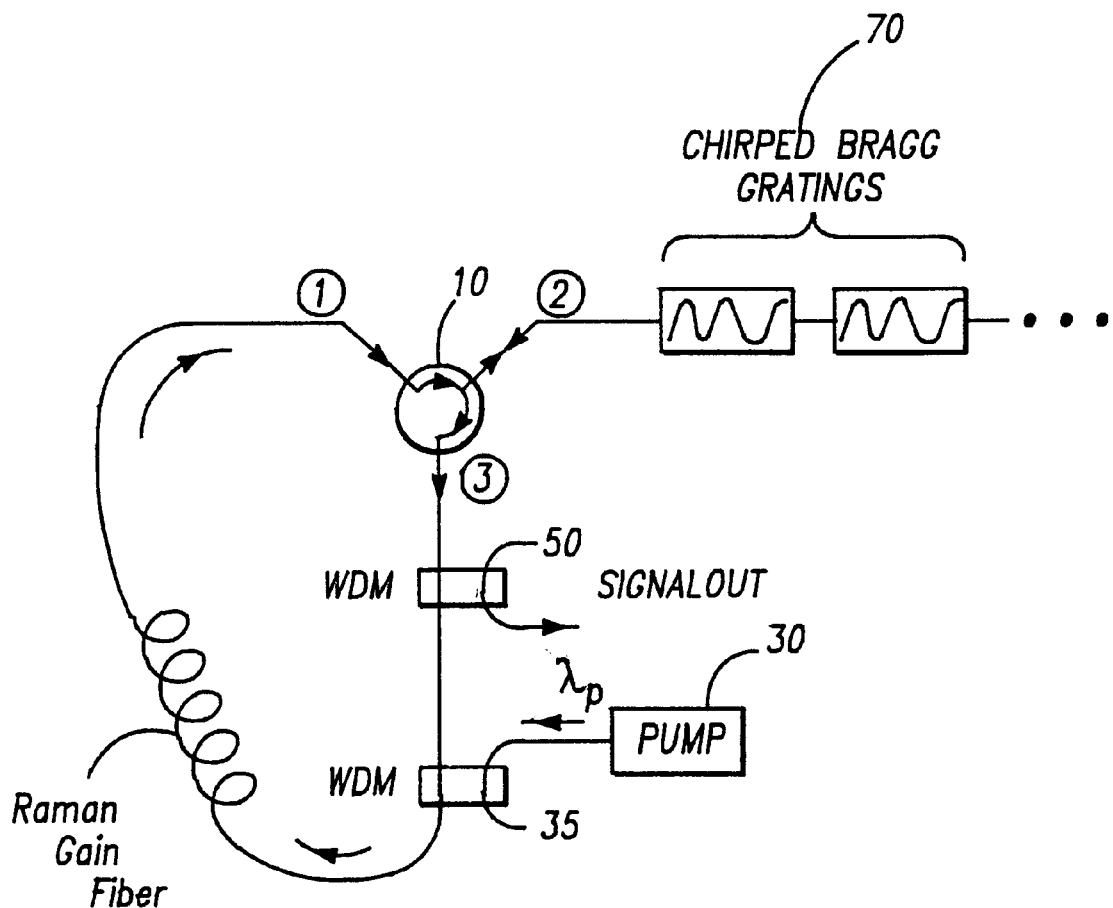
FIG.—7b

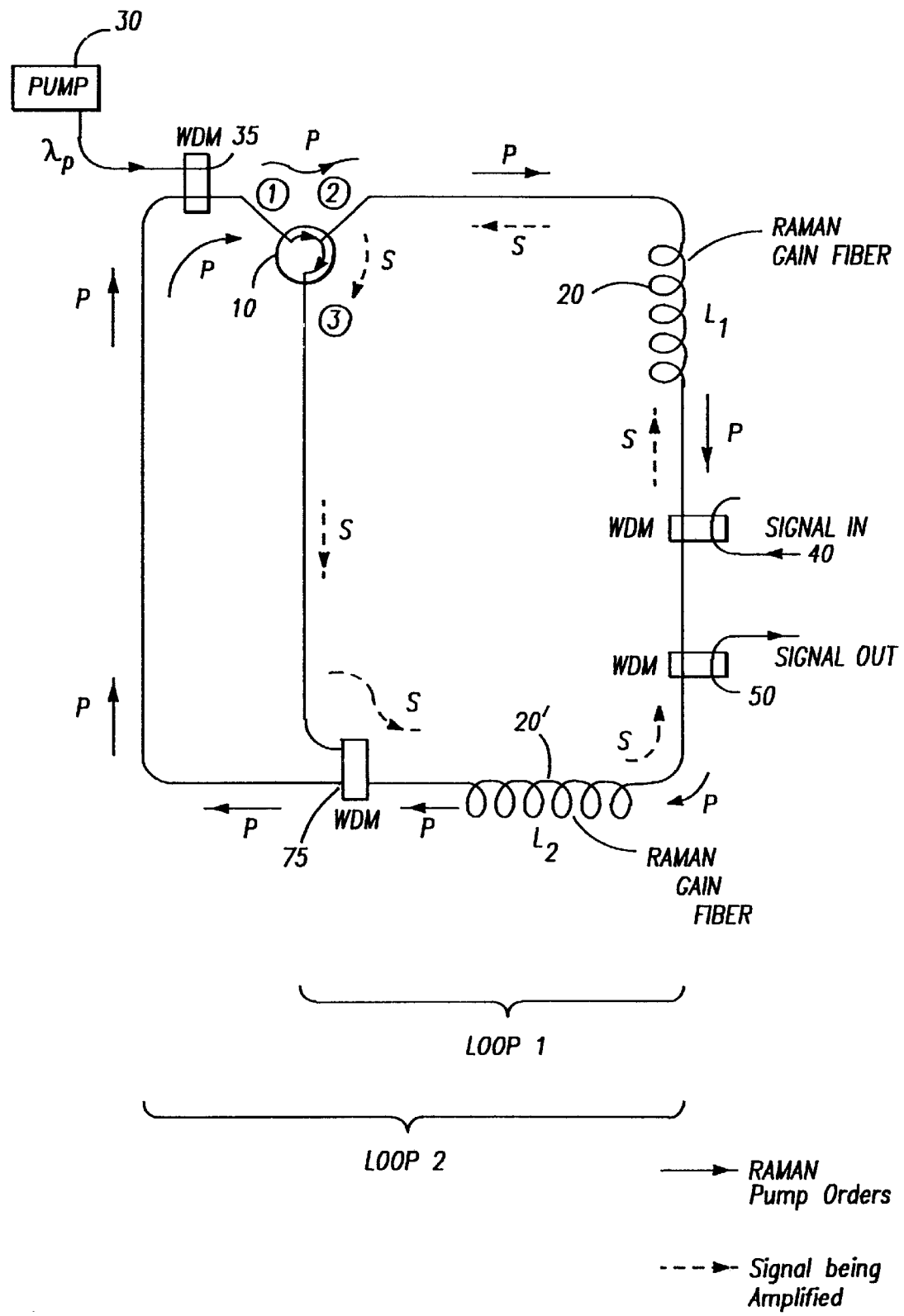
FIG.−8

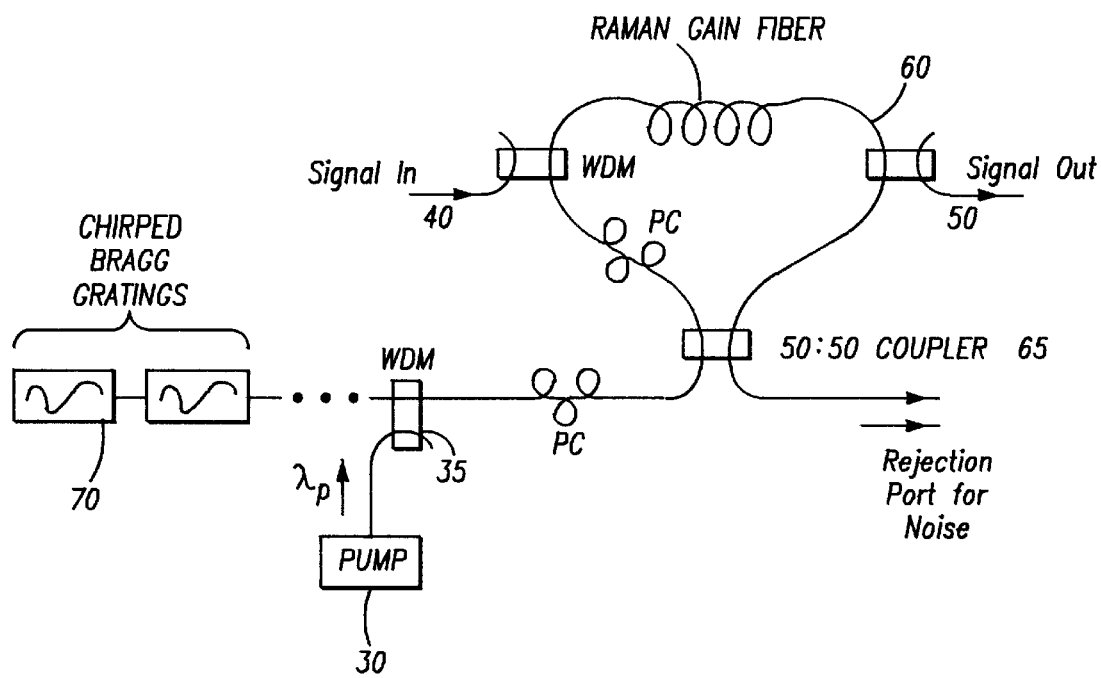
FIG.—10a
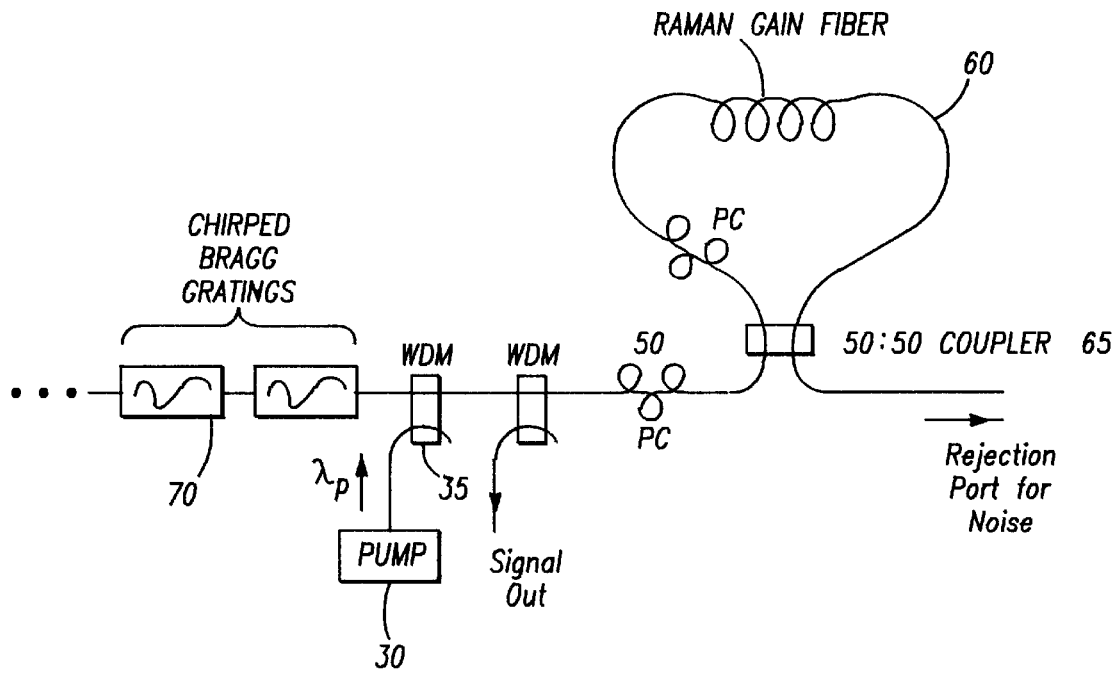
FIG.—10b

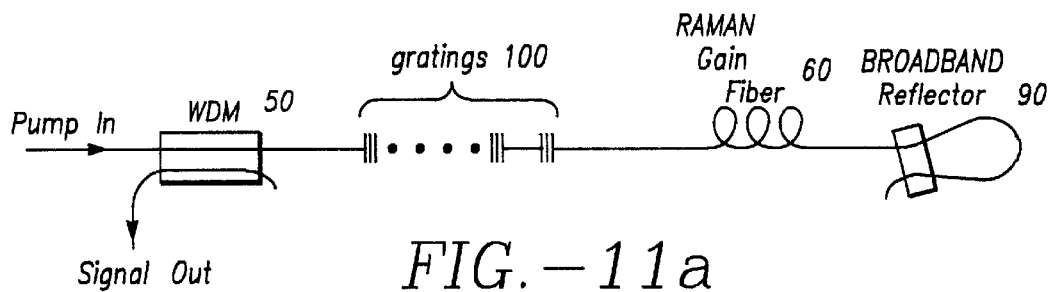
FIG.—11a
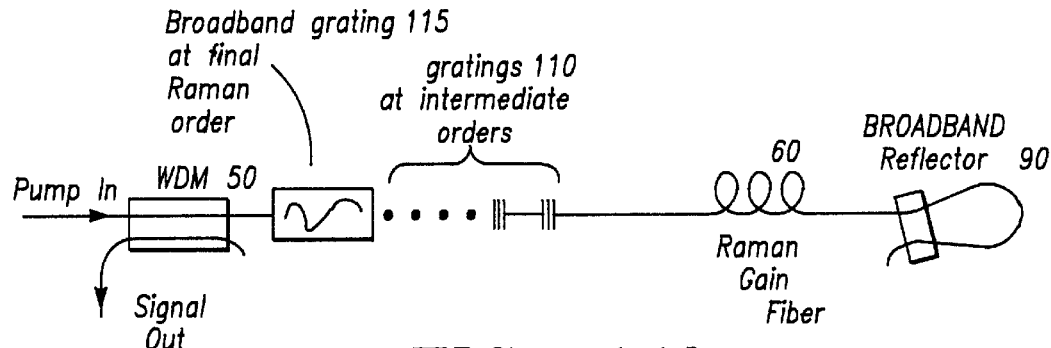
FIG.—11b
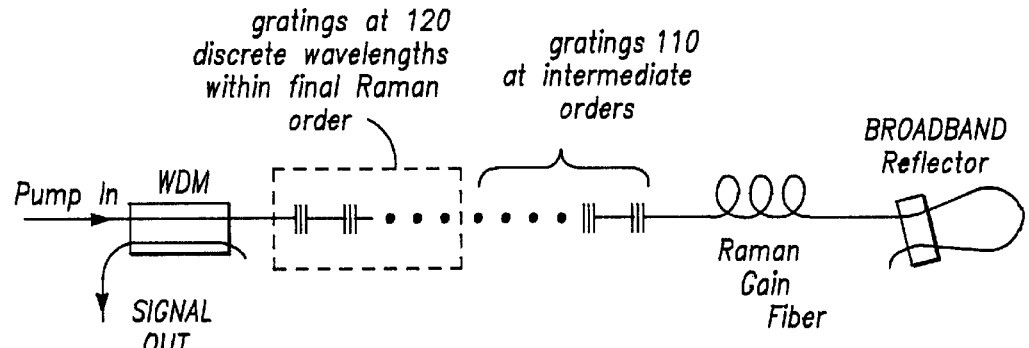
FIG.—11c
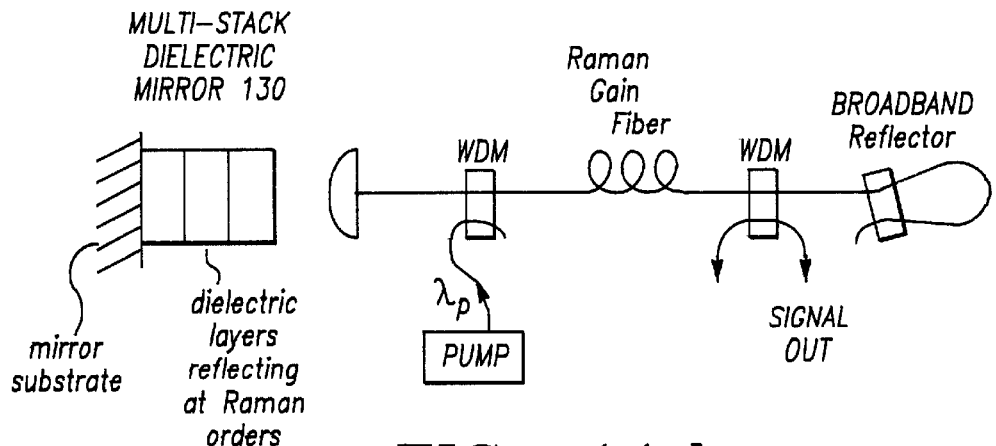
FIG.—11d

FIG.—16

CHIRPED PERIOD GRATINGS FOR RAMAN AMPLIFICATION IN CIRCULATOR LOOP CAVITIES

RELATED APPLICATIONS

The subject application claims the priority of U.S. provisional applications No. 60/078,692, entitled "Chirped Period Gratings for Raman Amplification in Circulator Loop Cavities," filed on Mar. 20, 1998, and No. 60/120,408, entitled "Chirped Period Gratings for Raman Amplification in Circulator Loop Cavities," filed Feb. 12, 1999.

FIELD OF THE INVENTION

The present invention relates generally to optical amplifiers used in fiber-optics for telecommunications, cable television and other fiber-optic applications. More particularly, the invention relates to an optical fiber amplifier utilizing Raman amplification in fibers and employing an optical circulator cavity and/or chirped Bragg gratings.

BACKGROUND OF THE INVENTION

With the large increase in usage of the internet, worldwide web, and other computer communications applications, the demand for communication capacity (often referred to as "bandwidth") has skyrocketed. Because of the high cost of installing new fibers and obtaining right-of-way, there is a large incentive to exploit to the fullest extent possible the bandwidth available in the embedded base of optical fibers.

The bandwidth of optical fibers is based on two key technologies: optical amplifiers and wavelength-division multiplexing (WDM). Optical amplifiers boost the signal strength and compensate for inherent fiber loss and other splitting and insertion losses. WDM refers to different wavelengths of light traveling in parallel over the same optical fiber. Although WDM is critical in that it allows utilization of a major fraction of the fiber bandwidth by using multiple "lanes" of fiber "highway," WDM would not be cost-effective without optical amplifiers. In particular, a broadband optical amplifier that permits simultaneous amplification of many WDM channels is a key enabler for obtaining use of the full fiber bandwidth.

There are two main low-loss telecommunications windows in optical fibers at wavelengths of 1.3 $\mu$m and 1.55 $\mu$m respectively. While Erbium-doped fiber amplifiers (EDFAs) have become the workhorse in the optical amplifier field, they only operate in the 1.55 $\mu$m window. Raman amplifiers have the advantage that they can operate in both optical communication windows, and, in fact, over the entire transparency window of optical fibers. Moreover, Raman gain increases system reliability since there is no excess loss in the absence of pump power. Raman based amplifiers are fully compatible with fiber systems since they are all-fiber devices.

As with any amplifier, noise is a consideration in deciding whether to use a Raman amplifier. The theoretical noise figure contribution from signal-spontaneous beating for Raman amplifiers has been shown to be 3 dB. However, system tests of Raman amplifiers have uncovered other sources of noise that generally are not important in EDFAs (cf. A. E. White and S. G. Grubb, "Optical Fiber Components and Devices," Ch. 7 in *Optical Fiber Telecommunications IIIB*, eds. I. P Kaminow and T. L. Koch. Academic Press, 1997). The first source of noise is from the coupling of intensity fluctuations from the pump light to the signal. The fundamental cause of this noise is the lack of a long upper-state lifetime to buffer the Raman gain from fluctuations in the pump intensity. It has been shown that when a counter-propagating amplifier geometry is used, the transit time of the amplifier can be used to average gain fluctuations due to the pump.

Second, double Rayleigh scattering can also give significant contributions to the noise figure of Raman amplifiers because of the long lengths of fiber used. Double-Rayleigh scattering corresponds to interaction between the signal and pump, where the signal is reflected by Rayleigh scattering in the backwards direction, but then it is scattered again in the forward direction by a second Rayleigh scattering. The scattered signal then interferes with the original signal, giving rise to noise degradation. The Rayleigh scattering is enhanced in long fiber lengths and in fibers with small core sizes and high core-cladding index differences, such as fibers with enhanced Raman cross-section. Double Rayleigh scattering has been observed in the past. The prior art solution to control the noise figure of the amplifier is to limit the fiber lengths used and construct multistage amplifiers.

Several Raman laser and amplifier cavity designs exist as prior-art, but they are not very appropriate for broadband amplification of WDM systems. S. G. Grubb and A. J. Stentz have described in *Laser Focus World*, pp. 127–134, (1996) a linear cavity that uses a series of gratings to define the end mirrors. However, the bandwidth of the gratings is sufficiently restrictive that the cavity operates over only about 2 nm. This is inadequate for WDM applications. As an improvement, Grubb, et al. in U.S. Pat. No. 5,623,508 also describe a ring cavity that uses an intra-cavity isolator to reduce double Rayleigh scattering and uses a counter-propagating pump to avoid pump fluctuations from coupling to the signal channel. The ring cavity design, however, is substantially more complicated, and since it also employs gratings it is also narrow band. Rather than using gratings, Chernikov, et al. (*Electronics Letters*, Vol. 31, pp. 472–473, March 1995), use wavelength selective couplers in their Raman cavity design. By using these broader band devices, they achieve a bandwidth of 6–10 nm. However, the couplers may be tricky to manufacture, and there are no means in the cavity for rejection or dampening of the double Rayleigh scattering.

A broadband Raman amplifier which is suitable for WDM systems has been experimentally demonstrated using a pump source consisting of the combined output of 8 high-powered semiconductor diode lasers (Optical Amplifier Conference 1988, ED3-2) which were only a single Raman order away from the desired peak gain. Since no Raman wavelength shifting of the pump was required, the power at each pump wavelength could be adjusted directly by adjusting the drive current of each diode laser. This allowed the gain spectrum of the amplifier to be precisely controlled. While a Raman amplifier using a combination of many laser diodes as the pump source offers a straightforward way of producing a Raman amplifier with a large optical bandwidth, there are some drawbacks. One such drawback is the inherent complexity of such an optical assembly, especially if very high pump powers are required. To double the output power of the pump requires at least twice as many laser diodes, polarization beam combiners, and WDMs be used. Another drawback is that the failure of a single pump laser would make it difficult to produce a flat gain spectrum by adjusting the output powers of the remaining devices, making reliable operation more difficult to achieve.

SUMMARY OF INVENTION

The present invention provides a structure for optical amplification of signals with counter-propagation of signal and pump beam and wavelength control while permitting broad bandwidth. The broadband optical amplifier of the invention combines optical amplification with a circulator loop cavity and/or chirped Bragg gratings to achieve bandwidth performance improvements that neither technology by itself has heretofore been able to deliver. The beneficial properties of the circulator loop cavity and/or chirped Bragg gratings can also combined with noise dampening property of the Sagnac Raman cavity, as described in U.S. Pat. No. 5,778,014.

In one embodiment of the circulator loop cavity, a counter-propagating pump beam amplifies the signal. Two ends of the circulator are connected with a gain medium. The signal travels through the gain medium in the opposite direction, and wavelength selective couplers are used to introduce and remove the signal. The intensity fluctuations of the pump beam is dampened by combining the circulator loop cavity with a Sagnac Raman amplifier, which has the property of reflecting the common mode signal while partially rejecting the difference mode noise.

The present invention also relates to wavelength control in the Raman amplifier through use of chirped Bragg gratings. A series of chirped Bragg gratings with reflection bands centered around the various Raman orders is attached to a third port of the optical circulator. The bandwidth is adjusted to permit for expanded bandwidth in each subsequent Raman order. In addition, gain flattening can be achieved by apodizing the gratings or by introducing filters with reflection coefficients opposite to the Raman gain spectrum.

Means of reducing the noise from double-Rayleigh scattering in a circulator loop cavity are also described. The use of multiple-stages of gain fiber connected with an isolator reduces the deleterious effects of double-Rayleigh scattering. The isolation of the circulator itself reduces the reflections, and the counter-propagating aspect of the signal and control can be achieved by adding a WDM coupler and a separate path for the pump orders. The wavelength control is implemented using chirped Bragg gratings by introducing an additional circulator into the separate pump path.

The chirped Bragg gratings are also used advantageously in other cavity designs to broaden the bandwidth. The invention discloses the use of chirped Bragg gratings in Sagnac Raman cavities or linear Fabry-Perot cavities to permit bandwidth expansion. Additionally, the gain bandwidth is forced to grow during each cascade Raman order. A broadband or multi-mode pump should be employed. The bandwidth increases during each cascade order due to the convolution with the ~20 nm Raman gain bandwidth. Further bandwidth expansion is accomplished by placing at least one of the intermediate Raman orders in close proximity to the fiber zero dispersion wavelength, so as to phase-match four-wave mixing or parametric amplification.

Finally, methods for enhancing the disclosed embodiments are discussed. Several efficiency improving cavity variations are detailed and an alternative method for enhancing the bandwidth of a Raman amplifier by producing multiple discrete pump wavelengths from a single-wavelength pump is disclosed.

BRIEF DESCRIPTION OF THE DRAWINGS

These and other objects, features and elements of the present invention will be better understood from the following detailed description of preferred embodiments of the invention in which:

FIG. 2 is a schematic illustration of a 3-port optical circulator.

FIG. 3a depicts an index profile for a chirped Bragg grating.

FIG. 3b is a schematic illustration of reflection points for different frequencies.

FIG. 4a is a schematic illustration of a first embodiment of a circulator loop cavity Raman amplifier.

FIG. 4b is a schematic illustration of a first embodiment of a circulator loop cavity Raman oscillator.

FIG. 6a is a schematic illustration of a path for various cascade Raman pump orders below the signal wavelength in the second embodiment as depicted in FIG. 5.

FIG. 6b is a schematic illustration of a path for the signal in the second embodiment as depicted in FIG. 5.

FIG. 7b is a schematic illustration of a second embodiment of the circulator loop cavity Raman oscillator using chirped Bragg gratings.

FIG. 8 is a schematic illustration of a fourth embodiment of the circulator loop cavity Raman amplifier for reduction of the influence of double Rayleigh scattering.

FIG. 10a is a schematic illustration of a Sagnac cavity Raman amplifier formed by a Sagnac Raman mirror at one end and chirped Bragg gratings at the other end.

FIG. 10b is a schematic illustration of a Sagnac cavity Raman oscillator formed by a Sagnac Raman mirror at one end and chirped Bragg gratings at the other end.

FIG. 11a is a schematic illustration of a first modified version of the linear cavity Raman oscillator of FIG. 10d.

FIG. 11b is a schematic illustration of a second modified version of the linear cavity Raman oscillator of FIG. 10d.

FIG. 11c is a schematic illustration of a third modified version of the linear cavity Raman oscillator of FIG. 10d.

FIG. 11d is a schematic illustration of a fourth modified version of the linear cavity Raman oscillator of FIG. 10d.

DETAILED DESCRIPTION OF PREFERRED EMBODIMENTS

To provide a better understanding of various mechanisms at work in the present invention, stimulated Raman scattering and Raman cascading are first described. Then, optical circulators and chirped Bragg gratings are reviewed. Next, preferred embodiments for a circulator loop cavity of the invention are presented. Modified versions of Sagnac and linear cavity embodiments are also provided. The final sections discuss generally applicable cavity variations and techniques which can be used to enhance amplifier bandwidth.

1. Stimulated Raman Scattering and Raman Cascading

Figure 1:
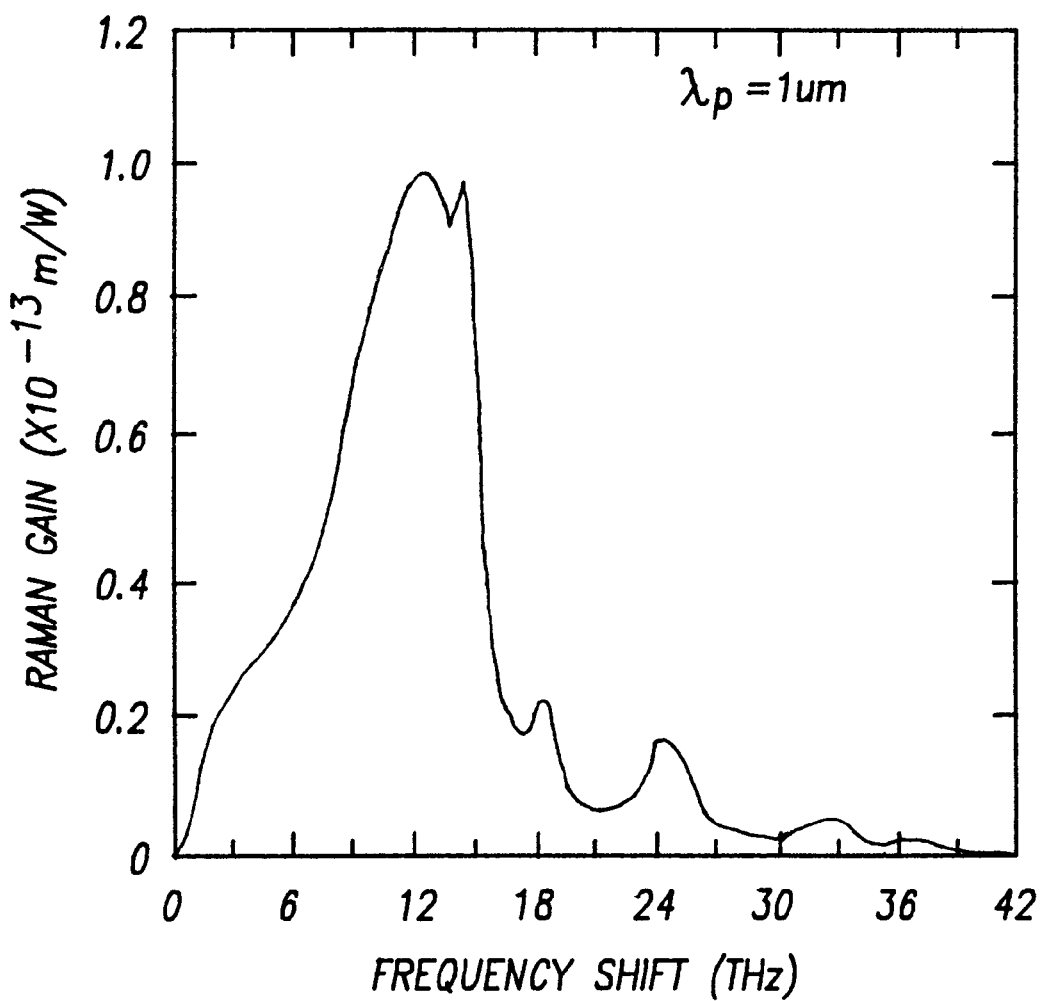
FIG. 1 depicts a measured Raman gain spectrum at a pump beam of a wavelength of 1 μm for fused silica fibers.

Stimulated Raman scattering is an important nonlinear process that turns optical fibers into amplifiers or tunable lasers. Raman gain results from the interaction of intense light with optical phonons in silica fibers, and Raman effect leads to a transfer of energy from one optical beam (the pump beam) to another optical beam (the signal). The signal has a downshifted frequency (or upshifted wavelength) by an amount determined by vibrational modes of the silica fibers. FIG. 1 depicts a Raman gain coefficient $g_r$ for the silica fibers at a pump beam having a 1 $\mu$m wavelength. The Raman gain scales inversely with respect to the pump beam wavelength. Notably, the Raman gain $g_r$ extends over a large frequency range up to 40 THz with a broad peak centered at 13.2 THz (i.e., 440 cm$^{-1}$). This large frequency range is due to the amorphous nature of the silica glass and enables the Raman effect to be used in broadband amplifiers. The Raman gain also depends on the fibercore composition and varies with dopant concentrations.

Cascading is the mechanism by which optical energy in a pump beam having a first wavelength is transferred to an optical signal at a longer wavelength through a series of nonlinear polarizations. Each nonlinear polarization of the dielectric produces a molecular vibrational state corresponding to a wavelength that is offset from the wavelength of the pump light that produces the stimulation. The nonlinear polarization effect is distributed throughout the dielectric, resulting in a cascading series of wavelength shifts as energy at one wavelength excites a vibrational mode that produces light at a longer wavelength. This process can cascade through numerous orders. Because the Raman gain spectrum has a peak centered at 13.2 THz in the silica fibers, the highest conversion efficiency is achieved typically when a Raman order is separated from the previous order by 13.2 THz. Other order separations can be used, however, to reach a specific target wavelength or to avoid a particularly lossy wavelength in the fibers. Because the Raman gain spectrum in silica fibers has a very large bandwidth (i.e., more than 5 THz around the 13.2 THz peak as shown in FIG. 1), this often does not significantly reduce the conversion efficiency. Heavily doped fibers can exhibit different Raman gain spectra depending on dopants used and their doping concentrations, and devices based on such fibers need to use appropriately modified order spacings to maximize efficiency.

Cascading makes stimulated Raman scattering amplifiers very desirable. Because of the large bandwidth of the gain spectrum, Raman amplification itself can be used to amplify multiple wavelengths (as in wavelength division multiplexing) or short optical pulses. Moreover, cascading enables Raman amplification over a wide range of different wavelengths. By varying the pump wavelength or using cascaded orders of Raman gain, the gain can be provided over the entire telecommunication window between 1300 nm and 1600 nm.

2. Optical Circulators

An optical circulator is a non-reciprocal device that redirects light from one port to another port sequentially in only one direction. The circulator transfer function is shown in FIG. 2. An input from port 1 is redirected to port 2. A reverse signal entering at port 2 totally transmits to port 3. However, ports 1 and 3 are completely isolated. Optical circulators are 3-port coupling devices that are made to have a low insertion loss and be polarization independent. Also, optical circulators are based on optical isolator technology, which is well established at this point.

3. Chirped Fiber Gratings with Broadband Reflection

Fiber grating filters result from periodic spatial modulation of the effective index of refraction in fiber. Most fiber Bragg gratings act as a reflection filter because of the existence of a stop band, i.e., a frequency region in which most of the incident light is reflected back. For a uniform period grating, the stop band is centered at the Bragg wavelength $\lambda_B = 2n\Lambda$, where $\Lambda$ is the grating period and n is the modal index. The periodic index variation couples the forward and backward-propagating waves at wavelengths close to the Bragg wavelength and, as a result, provides frequency-dependent reflectivity to the incident signal over a bandwidth determined by the grating length and strength of the index variation. Apodization techniques can be used to tailor the coupling coefficient (or index change) along the grating length.

Gratings with a uniform period have a relatively narrow stop band. However, a broadband grating is often required in practice. A solution is provided by the chirped fiber grating, in which the optical period $n\Lambda$ of the grating varies linearly over its length. FIG. 3a depicts an index profile of the chirp Bragg grating along the length of the grating. Since the Bragg wavelength $\lambda_B$ also varies along the grating length, different frequency components of an incident beam are reflected at different points, depending on where the Bragg condition is satisfied locally, as shown in FIG. 3b.

Chirped fiber gratings have been fabricated by using several different methods. It is important to note that it is the optical period $n\Lambda$ that needs to be varied along the grating. Thus chirping can be induced either by varying the physical grating period $\Lambda$ or by changing the effective mode index n along the length. In the commonly used dual-beam holographic technique, the fringe spacing of the interference pattern is made non-uniform by using dissimilar curvatures for the interfering wavefronts, resulting in $\Lambda$ variations. In a double-exposure technique, a moving mask is used to vary n along the length during the first exposure. A uniform-period grating is then written over the same section of fiber by using the phase-mask technique. Many other variations are possible. For example, chirped fiber gratings have been fabricated by tilting or stretching the fiber and by using strain or temperature gradients.

There is considerable interest in chirped gratings because they are used as dispersion compensators. Quite impressive results have been obtained to date with chirped Bragg gratings. For example, commercially available chirped gratings can have high reflectivity over a bandwidth of 40–50 nm. Alternately, if the phase of the reflection does not have to be of a uniform slope, a broadband reflector can be made by stitching together multiple sections of uniform gratings, thus providing a step-wise approximation to the chirped gratings. If chirped gratings of sufficient bandwidth cannot be made, then dielectric filters can also be used. However, the insertion loss may be higher when using bulk dielectric filters.

Note that when the term chirped Bragg grating is used herein, it does not necessarily require that such a grating have a particular optical phase characteristic. Usually a grating with a broadband reflection characteristic works as well as a truly "chirped" device with a known linear phase characteristic. In fact, the terms "chirped" and "broadband" are used interchangeably except where noted.

One way that the phase properties of a truly "chirped" Bragg grating could be used is to compensate for the dispersion of the gain fiber, effectively eliminating the round trip dispersion of an amplifier or oscillator cavity over the grating bandwidth. This could be used to enhance four-wave mixing and increase bandwidth in a manner analogous to using a fiber with zero-dispersion (this is detailed in several places below). The major limitation of this approach is that the gain fiber length must be comparable to or less than its coherence length, which is a function of dispersion. This typically occurs only in a low dispersion fiber or when using very short gain fibers.

4. Circulator Loop Cavity Designs

When various Raman orders propagate in the opposite direction to the signal, the crosstalk from the pump fluctuations to the signal is reduced. FIG. 4a depicts a first embodiment of a circulator loop cavity Raman amplifier configuration in which the pump beam and the signal are counter-propagating. Ports 2 and 3 of a circulator 10 are connected by a length of Raman gain fiber 20 to form a circulator loop cavity. The circulator has a band broad enough to operate properly at the pump and cascade Raman order wavelengths. For optimal operating conditions with an enhanced Raman gain, the Raman gain fiber is about 500 m long, and has a high germanium content, large core-cladding index difference and small effective area. A pump beam having a wavelength $\lambda_p$ from a pump 30 is introduced into the Raman gain fiber in a counter-clockwise direction using a wavelength-division-multiplexing (WDM) coupler 35. This WDM is characterized in that it couples the pump beam into the circulator loop cavity and allows passage of the cascade Raman orders and the signal wavelengths in the loop. The pump beam and the cascade Raman orders circulate in the counter-clockwise direction along the Raman gain fiber in FIG. 4a.

A signal to be amplified is introduced at one end of the Raman gain fiber and removed from the other end of the fiber using WDMs 40 and 50 respectively. The signal travels in the circulator loop in a clockwise direction, opposite to the pump and the cascade Raman orders. WDMs 40 and 50 couple the signal wavelength into or out of the loop while allowing passage of the pump beam and the cascade Raman orders wavelengths in the loop. As an alternative, only one WDM is used to remove the signal if the signal is introduced into the circulator loop using port 1 of the circulator 10.

Similar to the amplifier in FIG. 4a, a first embodiment of a circulator loop cavity Raman oscillator is implemented in FIG. 4b. The circulator loop cavity Raman oscillator comprises a circulator 10 having a Raman gain fiber 20 connected between ports 2 and 3 of the circulator. A pump beam having a wavelength $\lambda_p$ from pump 30 is introduced into the Raman gain fiber using a WDM coupler 35. A signal is removed from the circulator loop at WDM 50. Since the signal is developed from noise in the oscillator, a partially coupling over WDM is used to generate an optical feedback in the loop to enhance the strength of the signal.

Figure 5:
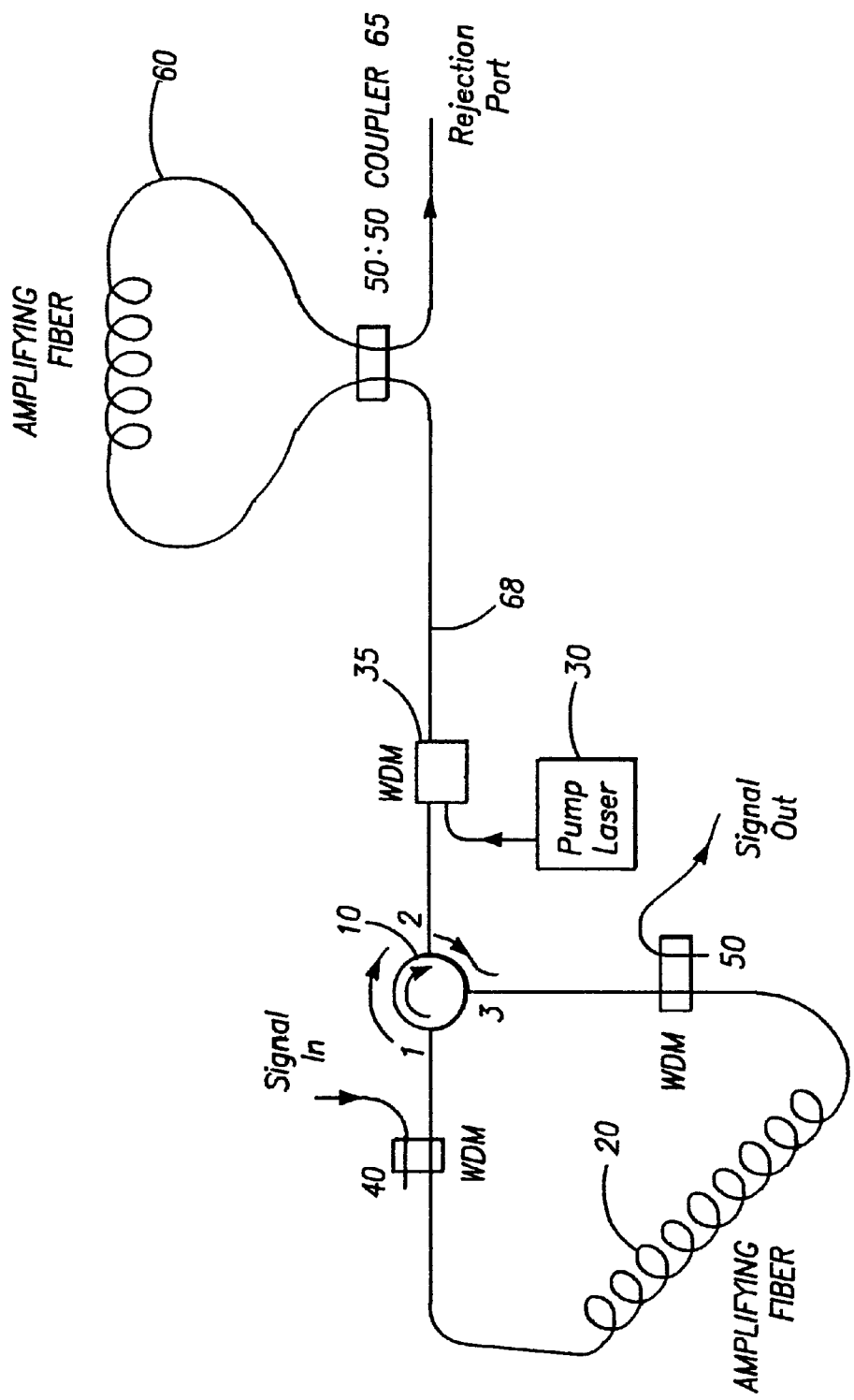
FIG. 5 is a schematic illustration of a second embodiment of the circulator loop cavity Raman amplifier which uses a circulator loop cavity for counter-propagation and a Sagnac Raman mirror for noise dampening.

The cascaded Raman gain process could lead to growth of intensity fluctuations through increasing Raman orders. To reduce pump fluctuations and decouple pump and signal fluctuations, a second embodiment of the circulator loop cavity Raman amplifier configuration is now described in conjunction with FIG. 5. The circulator loop cavity Raman amplifier comprises a Sagnac Raman mirror and a circulator loop cavity. The Sagnac Raman mirror has an amplifying fiber 60 with its two ends connected to a 50:50 coupler 65. The circulator loop cavity comprises a circulator 10 having another amplifying fiber 20 connected between ports 1 and 3. Port 2 of circulator 10 is connected to coupler 65 by optical fiber 68. A pump beam from a pump laser 30 is introduced between the Sagnac Raman mirror and the circulator loop cavity by WDM 35 which couples the pump beam to fiber 68 but allows passage in fiber 68 of cascade Raman orders. FIG. 6a shows in arrows the cavity for the cascade Raman pump orders which is formed on the left side by the circulator loop mirror and the Sagnac loop mirror on the right side. The Sagnac mirror provides a dampening to the intensity fluctuations during the cascade Raman process because it reflects the common mode cascade Raman orders but rejects partially the difference mode noise.

A signal to be amplified is inserted and removed from the circulator loop cavity using WDMs 40 and 50 respectively. These WDMs couple the signal wavelength to the circulator and allow passage of the Raman pump orders. As shown in FIG. 6b, the signal wavelength travels in the circulator loop cavity in the opposite direction to which the cascade Raman pump orders travel as shown in FIG. 6a.

In the two embodiments disclosed above, no explicit wavelength selection means is provided in the circulator loop cavity or its combination with the Sagnac mirror. Hence, the various cascade orders for Raman amplification are operated near the gain peak and separated by ~13.2 THz. The spectrum of the radiation is set by the gain bandwidth and gain saturation. However, the radiation wavelengths could be affected by any wavelength-selective elements in the cavity such as the circulator and the WDMs. In addition, because of the dependence on gain saturation, the operating wavelengths may vary with pumping power level.

Therefore, for stable operation without wavelength variation with pump power, it is desirable to introduce a wavelength control element for various cascade Raman orders in the cavity. To allow for broadband amplification, the filtering by the wavelength control element should have broad bandwidth. This is particularly necessary if each subsequent cascade Raman order is expected to be broadened further in bandwidth. For example, if a pump beam at 1117 nm is used to provide gain at 1480 nm, the intermediate cascade Raman orders are then 1117 nm→1175 nm→1240 nm→1310 nm→1390 nm→1480 nm. Suppose that the pump beam has a bandwidth of 1 nm. Then, it may be desired to have bandwidths in the corresponding orders 1 nm→10 nm→20 nm→30 nm 40 nm→50 nm.

One means of tailoring the bandwidth at the various orders while reducing the fiber insertion loss is to use chirped Bragg fiber gratings. As discussed earlier, commercial gratings are now available with bandwidths as large as 40–50 nm. Also, adjusting the length and variation in periodicity of the grating can control the bandwidth. The Bragg condition at the center of each of the gratings is made to coincide with the maximum gain wavelengths of the cascade Raman orders. One feature of fiber Bragg gratings, however, is that they operate in reflection mode only.

Figure 7A:
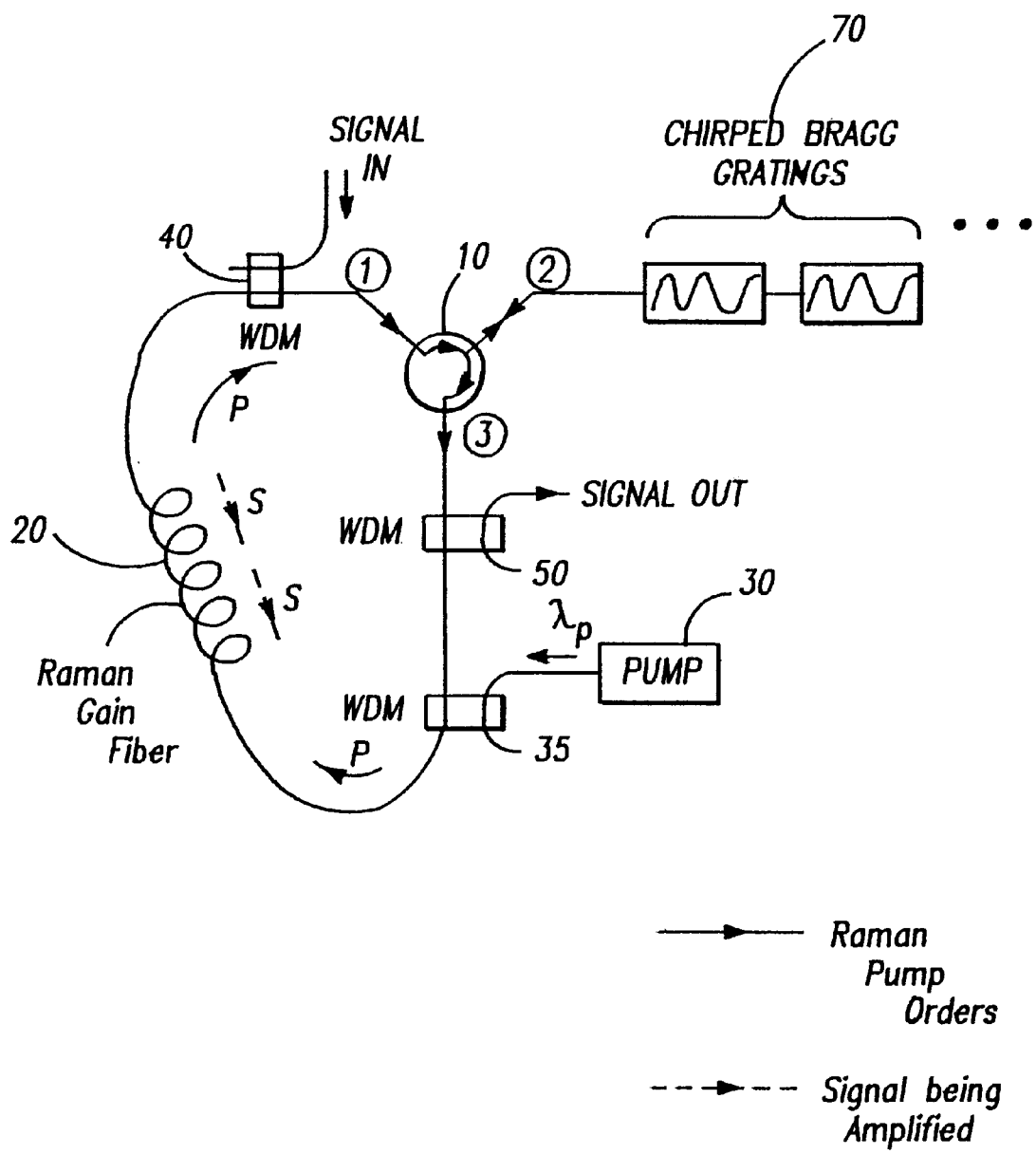
FIG. 7a is a schematic illustration of a third embodiment of the circulator loop cavity Raman amplifier using chirped Bragg gratings.

FIG. 7a illustrates a third embodiment of the circulator loop cavity Raman amplifier having reflection-mode chirped Bragg gratings. A length of Raman gain fiber 20 is connected between ports 1 and 3 of a circulator 10. A pump beam from a pump 30 is input through WDM 35 at one end of the Raman gain fiber and travels in a clockwise direction along the Raman gain fiber. A plurality of chirped Bragg gratings 70 are spliced to port 2 of the circulator. Each chirped Bragg grating is used for one intermediate cascade Raman order. A signal to be amplified is inserted and removed by placing two WDMs 40 and 50 respectively at two ends of the Raman gain fiber. The signal travels along the Raman gain fiber in the counter-clockwise direction.

In the amplifier configuration of FIG. 7a, the signal and cascade Raman pump orders are counter-propagating to reduce any crosstalk therebetween. The chirped Bragg gratings provide wavelength control and broadband reflection at the various Raman cascade orders. Thus, the wavelengths for the various cascade Raman orders are selected, while enough broadband reflection is provided to permit broadened bandwidth at each subsequent cascade order. It is noted that dielectric filters may be used in place of the chirped Bragg gratings to achieve the wavelength control.

The gratings attached to port 2 of the circulator can also advantageously be used to provide for gain flattening or gain equalization. As shown in FIG. 1, the Raman gain has a Gaussian-like gain band. The chirped Bragg gratings could, for example, be apodized to provide less reflection at the center of the band than at the sides. In other words, the reflection coefficient could have the opposite shape to the Raman gain band. Alternately, additional gain flattening elements—such as long-period gratings, Mach-Zehnder interferometers, or Fabry-Perot filters—could be introduced at port 2 to undo the curvature of the Raman gain band. Of course, gain flattening elements can also be placed after the signal output port, as is traditionally done in broadband amplification.

FIG. 7b provides a second embodiment of the circulator loop cavity Raman oscillator in which chirped Bragg gratings are implemented for wavelength control. Unlike the amplifier configuration in FIG. 7a, the oscillator has only an output port 50. It is usually necessary to have an optical feedback in the loop. This is achieved either by using only a partially coupling over WDM or by adding a feedback element such as a partially reflecting Bragg grating or mirror to the fiber connected to port 2 of the circulator. The output signal in the latter case is extracted from the fiber attached to port 2 of the circulator.

FIG. 8 depicts a fourth embodiment of the circulator loop cavity Raman amplifier which is capable of counter-propagating the signal and the pump and yet reducing double Rayleigh scattering in the circulator loop cavity. The circulator loop cavity Raman amplifier of FIG. 8 comprises a signal cavity loop 1 and a Raman pump cavity loop 2. The signal cavity loop comprises a first Raman gain fiber 20 connected to port 2 of a circulator 10 at one end and to a second Raman gain fiber 20' at the other end. The second Raman gain fiber is then connected to port 3 of the circulator through a WDM 75. A signal to be amplified is introduced and removed from the signal cavity loop through WDMs 40 and 50 respectively. The signal travels in a counter-clockwise direction in the signal cavity loop in which the circulator acts as an isolator. All three WDMs used in the signal cavity loop couple the signal wavelength into the signal cavity loop but allow passage in the loop of the pump beam and the cascade Raman pump order wavelengths.

The Raman pump cavity loop is formed externally between ports 1 and 2 of the circulator. Specifically, a pump beam light from a pump laser 30 is introduced by WDM 35 to port 1 of the circulator. The WDM 35 couples over the pump wavelength but allows passage therein all subsequent cascade Raman orders. Connecting the pump laser close to port 1 of the circulator also provides isolation to the pump beam from reflections in the fibers or stimulated Brillouin scattering in the fibers. The pump beam first travels from port 1 to port 2. Then it travels along the first and second Raman gain fibers in a clockwise direction to pump the fibers for gain, and finally returns to port 1 through WDM 75. By adding WDM 75 at the bottom of FIG. 8 and an additional path to the cavity of FIG. 4a for the pump beam, the pump cavity is different from the signal cavity.

Figure 9:
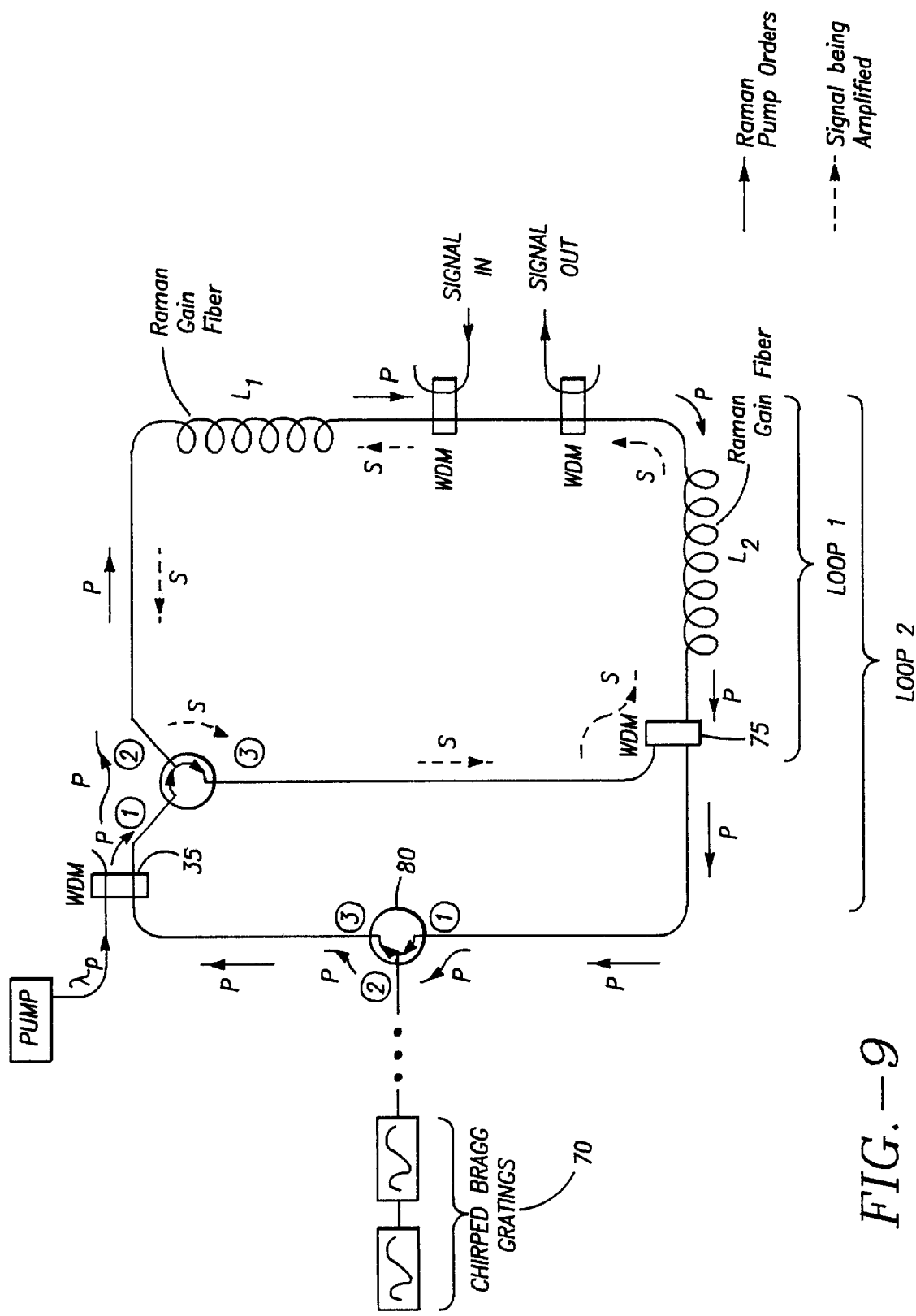
FIG. 9 is a schematic illustration of a fifth embodiment of the circulator loop cavity Raman amplifier with broadband wavelength control and reduction of the influence of double Rayleigh scattering.

FIG. 9 depicts a fifth embodiment of the circulator loop cavity amplifier which adds a wavelength control to the configuration in FIG. 8. In addition to the elements disclosed in FIG. 8, a second circulator 80 is added with its port 3 connected to WDM 35 and port 1 connected to WDM 75 in the Raman pump cavity loop. Chirped Bragg gratings 70 are coupled with port 2 of the second circulator for the various cascade Raman orders. The path for the various cascade Raman orders now reflect from the chirped Bragg gratings thereby enabling the broadband wavelength control. The signal path in the signal cavity loop remains the same as that in FIG. 8.

Although the complexity of the cavity in FIG. 9 has grown, it embodies all of the features for optimal stable wavelength operation and improved noise performance. That is, the circulator loop cavity Raman amplifier according to FIG. 9 has the following features:

Reduction of the noise crosstalk from the pump beam to the signal by counter-propagating of the pump beam and the signal;

Broadband wavelength control by using chirped Bragg gratings;

Reduction of double Rayleigh scattering by using multiple gain segments and isolation between the stages by the circulator;

Isolation of the pump from spurious reflections or stimulated Brillouin scattering in the gain fibers, where the isolation is again provided by the circulator.

The circulator loop cavity uses a Raman optical fiber as the gain medium as demonstrated in these embodiments. Note however that such circulator loop cavity can be used for other types of gain medium. Moreover, the optical circulator may also be substituted by two optical isolators in series.

5. Alternate Raman Cavity Designs Using Chirped Bragg Gratings

The chirped period Bragg gratings can also be used in other Raman cavity designs to enhance the bandwidth while providing wavelength selectivity. FIGS. 10a and 10b illustrate the use of chirped Bragg gratings 70 at one end of a Sagnac Raman amplifier cavity and Sagnac Raman oscillator cavity respectively to avoid any drift in wavelength with pump power or environmental changes. The Sagnac Raman cavity provides for noise dampening during the cascaded Raman amplification process by rejecting at least half of the fluctuations between the clockwise and counter-clockwise directions around the Sagnac cavity. For detailed descriptions thereof, please refer to U.S. Pat. No. 5,778,014, which is incorporated herein by reference. A pump beam is introduced into the cavity using WDM 35. Two ends of the Raman gain fiber 60 are attached to a coupler 65 to form a Sagnac loop. The coupler nominally has a 50:50 coupling ratio over the wavelength range between the pump beam and the cascade Raman orders. Polarization controllers (PCs) may be required to use for an optimal operation of the Sagnac loop.

For the Sagnac Raman amplifier, a signal is inserted and removed by using WDMs 40 and 50 respectively within the Sagnac loop. The pump beam propagates in both directions around the Sagnac loop, while the signal only propagates in the clockwise direction along the Raman gain fiber. Consequently, a strictly counter-propagating amplification between the pump beam and the signal may not be maintained. However, because of the noise dampening property of the Sagnac loop, the noise crosstalk between the pump beam and signal may not be as important.

For the Sagnac Raman oscillator, an output signal is obtained from WDM 50. If WDM 50 is not used, the output signal is output from the end of the chirped Bragg gratings. Either oscillator configuration also typically requires optical feedback to operate efficiently. The optical feedback is provided by a partially reflecting Bragg grating or mirror at the signal output port, or by a partially coupling over WDM. In the latter case, the output signal would be removed from both sides of WDM 50 and a high reflectivity chirped Bragg grating at the signal wavelength would also be needed.

Figure 10C:
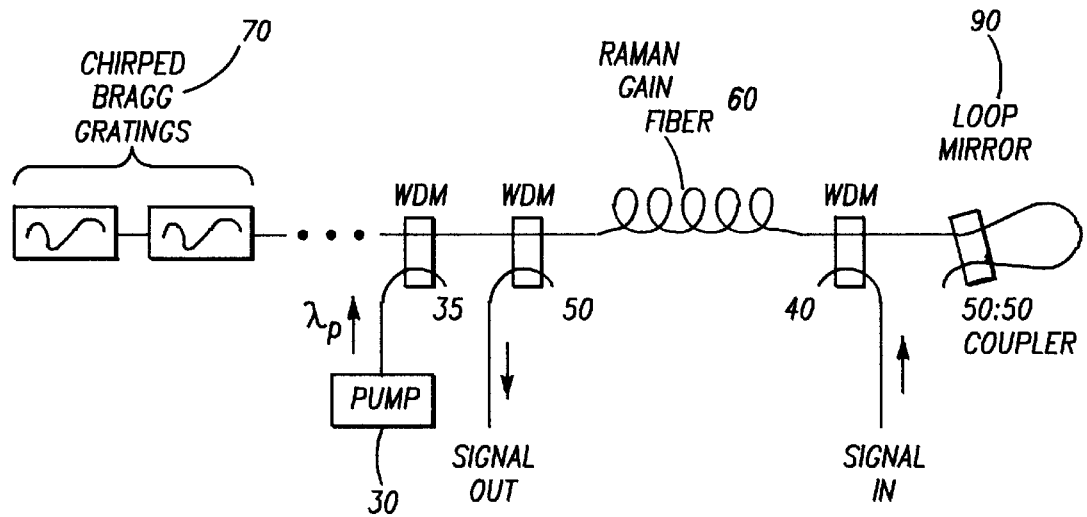
FIG. 10c is a schematic illustration of a linear or Fabry-Perot cavity Raman amplifier with one end of the cavity formed by chirped Bragg gratings.
Figure 10D:
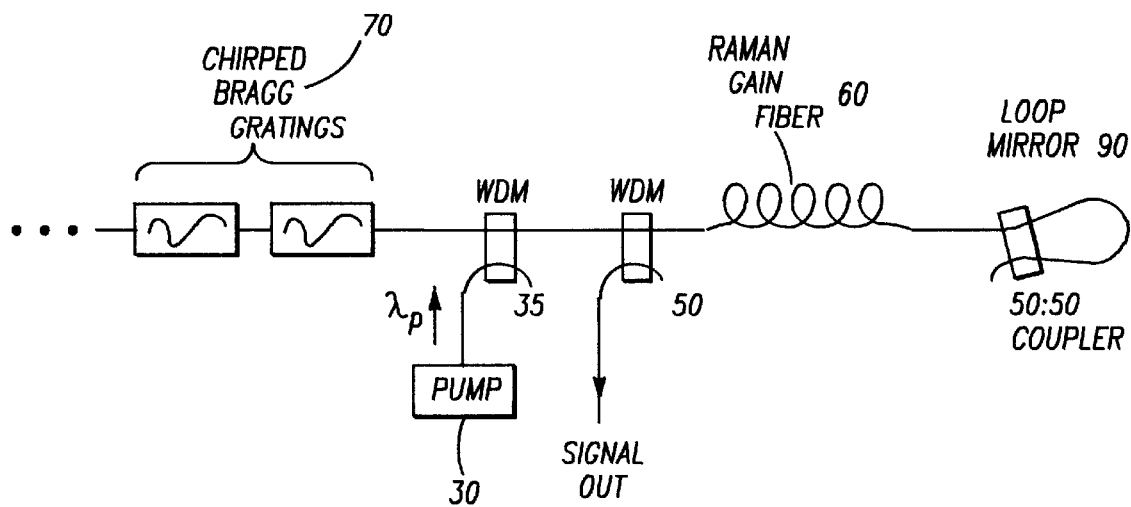
FIG. 10d is a schematic illustration of a linear or Fabry-Perot cavity Raman oscillator with one end of the cavity formed by chirped Bragg gratings.

The polarization controllers (PCs) in the Sagnac Raman cavity may prevent a "turn-key" operation of the oscillator. To avoid using PCs, the gain fiber may be laid out in a linear cavity configuration, and a short length of fiber may be used in a loop mirror as a broadband high-reflectivity mirror. FIGS. 10c and 10d show a linear cavity design for the amplifier and the oscillator respectively which also benefit from the use of chirped Bragg gratings. Chirped Bragg gratings 70 form one end of the cavity which comprises a Raman gain fiber 60. It is preferred that the Raman gain fiber has a length of 1 km or less. It is also preferred that a dispersion compensating fiber is used as the Raman gain fiber. A broadband reflector, such as a short Sagnac loop mirror 90, forms the other end of the cavity. The broadband reflector in this situation reflects at least two cascade Raman order. A pump beam from pump 30 is introduced into the cavity using WDM 35. For the amplifier in FIG. 10c, a signal is inserted and removed using WDMs 40 and 50 respectively from the Raman gain fiber. For the oscillator in FIG. 10d, an output signal is obtained from WDM 50 or, as an alternative, from the end of the chirped Bragg gratings 70 if WDM coupler 50 is not used. Either oscillator configuration typically requires an optical feedback to operate efficiently. This can be achieved by using a partially reflecting Bragg grating or mirror at the signal output port, or by a partial coupling WDM. In the latter case, the output signal would be removed from both sides of the signal WDM and a high reflectivity chirped Bragg grating at the signal wavelength would also be needed. This cavity then has the desired wavelength control while permitting broadband gain. Although this cavity does not guarantee counter-propagating signal and pump beams, it is very simple and low-cost to implement.

Further modifications on the laser oscillator design of FIG. 10d are now described. Note however that these modifications can also be applied to the other designs described herein.

FIG. 11a shows a linear Raman oscillator laser cavity that is formed with a broadband reflector such as a Sagnac loop mirror 90 at one end and Bragg gratings 100 for each of the Raman cascade orders at the other end. A gold or dielectric coated fiber end can also be used as the broadband reflector. The broadband reflector in this situation reflects at least two cascade Raman order. A Raman gain fiber 60 is located between these two cavity ends. WDM 50 is used outside the cavity to insert the pump and remove a desired signal output. In this configuration, the intracavity loss of the Raman oscillator is reduced relative to the design in FIG. 10d and the output efficiency is thus increased.

For the design of FIG. 11a to operate properly, the Bragg grating at the final Raman order (i.e., signal wavelength) should be partially reflecting to serve as a cavity output coupler. The optimal reflectivity for this output coupler depends on the gain fiber length and type and on the output wavelength. It is typically in the range of 5–40%. The Bragg gratings also substantially transmit light at the pump beam wavelength and at the signal wavelength except for the output coupler as described above. It should be noted that the gratings could be located at substantially different distances from the broadband reflector to enclose differing lengths of the Raman gain fiber, should device optimization require it. Likewise, the grating wavelength ordering can be selected to optimize operation.

FIG. 11b shows a linear Raman oscillator cavity which is capable of making the output broadband while still retaining a high efficiency. Regular gratings 110 are used at the intermediate Raman cascade orders, and a broadband grating 115 is used at the final Raman order to keep the intermediate Raman orders narrowband and have only the last Raman order broadband. Both the regular gratings and the broadband grating are at same end of the cavity. In other respects, the cavity of FIG. 11b has the same properties as that of FIG. 11a. As an alternative, the bandwidth of the cavity is gradually increased by starting with a regular grating at the first Raman order and then increasing the grating bandwidth at each subsequent Raman order.

FIG. 11c shows another modification of the linear Raman oscillator cavity of FIG. 11a in which several discrete output wavelengths are produced rather than a continuous broadband output. Regular gratings 110 and gratings at final Raman order 120 are used for the intermediate Raman cascade orders and the final Raman order respectively. Both the gratings are at same end of the cavity. In other respects, the cavity of FIG. 11c has the same properties as that of FIG. 11a. As one application, if the Raman oscillator output is to pump a Raman gain fiber in a transmission line, the output desired may be discrete wavelengths separated by 10 to 40 nm rather than a continuous broadband output. The cavity of FIG. 11c can be used to accomplish this. A design combining the ideas of FIGS. 11b and 11c, and thus employing several non-overlapping broadband gratings at the final Raman order, could also prove useful. More generally, the spectrum of the output can be crafted by controlling the reflection properties of the grating or gratings at the final Raman order.

The Raman gain fiber used this section is preferred to have a length of 1 km or less. It is also preferred to use a dispersion compensating fiber as the Raman gain fiber. The Raman oscillator cavities of FIGS. 11a–c can be easily manufactured from a single continuous length of fiber, thereby eliminating all intracavity splice losses and further increasing output efficiency and device reliability. Each of the Bragg gratings in such a continuous fiber cavity can be monitored while it is being created by simply measuring the transmission or reflection spectrum of the fiber, since no two gratings have the same center wavelength. This monitoring is typically required to produce consistent gratings, and would not be possible in some previous designs. After all of the gratings are created, the broadband reflector would be formed in the fiber or a broadband reflective coating would be added to complete the oscillator cavity.

FIG. 11d illustrates a linear Raman oscillator cavity that uses a multi-stack dielectric 130 as an end mirror. When several gratings are used at one end of the cavity, the cost could increase as well as the splice loss for assembling the gratings. Dielectric stacks are advantageous because they are low-loss and can handle high powers, and the design and manufacturing of dielectric mirrors is a well-known and established technology. To improve collimating in the cavity, a lens is used before the multi-stack dielectric end mirror.

In particular, dielectric coatings are applied to a mirror substrate to reflect at each of the Raman cascade orders. Individual coating layers at each of the Raman orders can be cascaded so long as the wings or ripples from one coating layer do not appear at the other Raman orders. Each of the dielectric stacks is tailored to provide the desired bandwidth. For example, as in FIG. 11b, the reflection at the intermediate Raman orders is narrowband while the reflectivity at the final Raman order is broadband. Alternately, the reflectivity bandwidth can be increased gradually at each subsequent Raman order. In addition, the order of the dielectric stacks may be chosen from damage considerations. For instance, the cavity power tends to be highest at the pump wavelength and final Raman order. Therefore, the mirror stack could have the outermost layer reflect the pump wavelength, the next layer reflect the final Raman order, and the subsequent layers reflect the remaining intermediate Raman orders.

6. Means of Broadening Gain with the Cavity Bandwidth

Thus far means of implementing broadband cavities by using chirped Bragg gratings or, alternatively, dielectric reflectors have been described. The broadband cavity design only permits broadband operation, but it does not guarantee that the gain fills the entire cavity wavelength window. Therefore, there is a need to increase the gain bandwidth to fill the entire window. To start with, it is desirable to have a broadband or multi-mode pump. For example, cladding pumped fiber lasers provide gain width of about 4 nm with a cleaved fiber output, or about 1 nm with a uniform grating reflector. Using a chirped Bragg grating reflector instead could broaden this 1 nm bandwidth further. The multi-mode pump is also desired to avoid stimulated Brillouin scattering, where a narrow band pump is reflected by acoustic phonons in the fiber.

During the cascade Raman process, the gain bandwidth also increases. As shown in FIG. 1, the gain peak for Raman gain in fibers is at 13.2 THz, and the gain bandwidth is about 5 THz (or ~20 nm). So long as the cavity does not restrict it, the gain bandwidth increases after each Raman order because the gain is the convolution of the pump band and the Raman gain spectrum. One advantage of the Raman gain is that the gain band, which is shifted by the phonon energy from the pump band, broadens if the pump band broadens.

Nonlinear polarization amplifiers can also lead to broadened bandwidth during the cascade Raman process. For a detailed description, refer to U.S. patent application Ser. No. 09/046,900 which is incorporated herein by reference. In particular, at least one order of the cascade Raman order must lie within close proximity (i.e., plus or minus 5 nm) of the zero dispersion wavelength of the gain fiber. Then, the gain broadens through phase-matching of either four-wave mixing or parametric amplification. Therefore, the gain bandwidth of any of the configurations in FIGS. 4–11 can be enhanced by using fiber with a zero dispersion wavelength in close proximity to an intermediate Raman order. Alternately, a gain-flattened fiber with low dispersion over more than one Raman order can lead to phase-matching at more than one pump order.

There exists a distinction in use of narrowband and chirped period gratings. The chirped grating can be approximated by a step-wise approximation—i.e., several uniform-period Bragg gratings are cascaded. Normally, when a resonator cavity lases, its linewidth narrows and usually operates primarily near the peak gain wavelength. This is particularly true in a homogeneously broadened gain medium that experiences gain saturation. At room temperature, Raman gain acts as a homogeneously broadened system due to pump depletion—i.e., if the pump is depleted at one wavelength, it is reduced for the entire gain band. If a broadband cavity is used, the wavelength range over which the resonator can lase increases, but it does not necessarily mean that the laser linewidth will increase. On the other hand, for the case of Raman amplification in fibers, the observation is that with broader bandwidth gratings, the output bandwidth correspondingly increases.

Figure 12A:
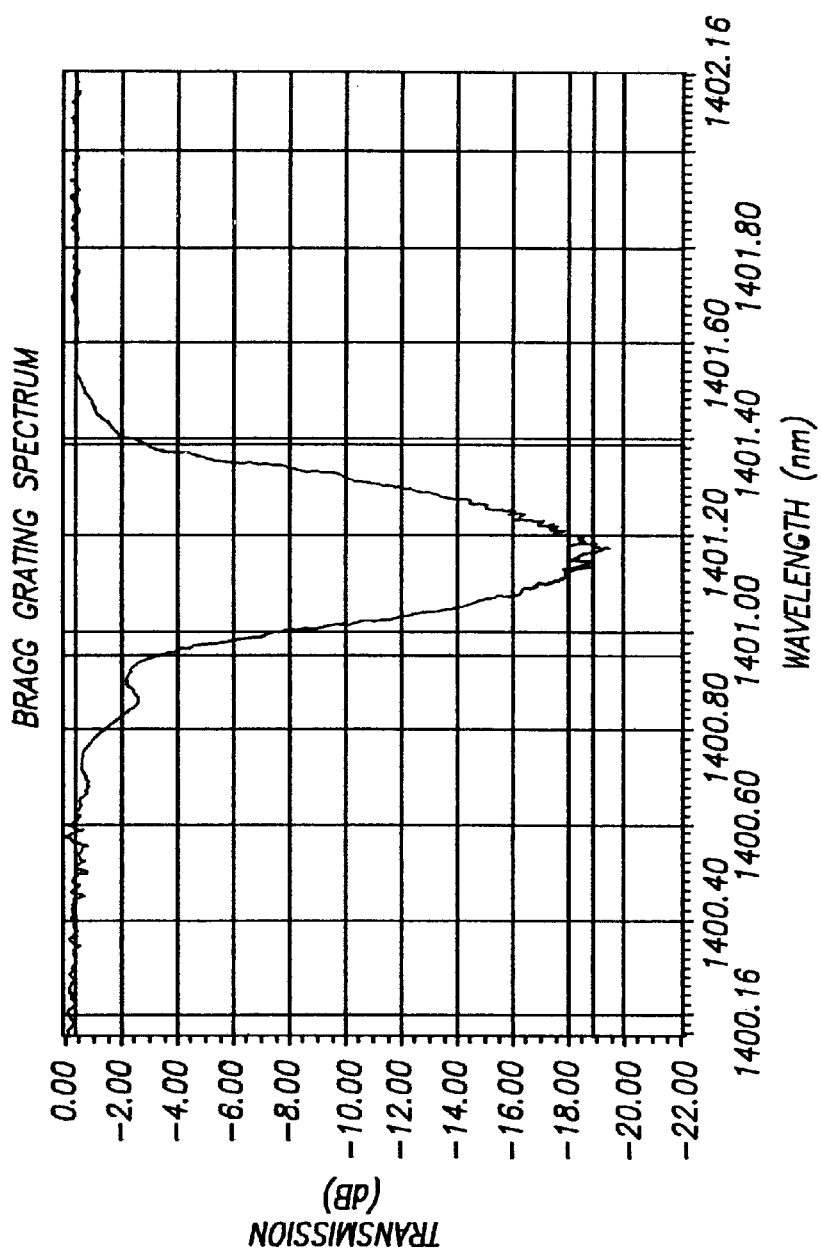
FIG. 12a depicts a narrowband Bragg grating spectrum having a bandwidth of 0.44 nm.
Figure 12B:
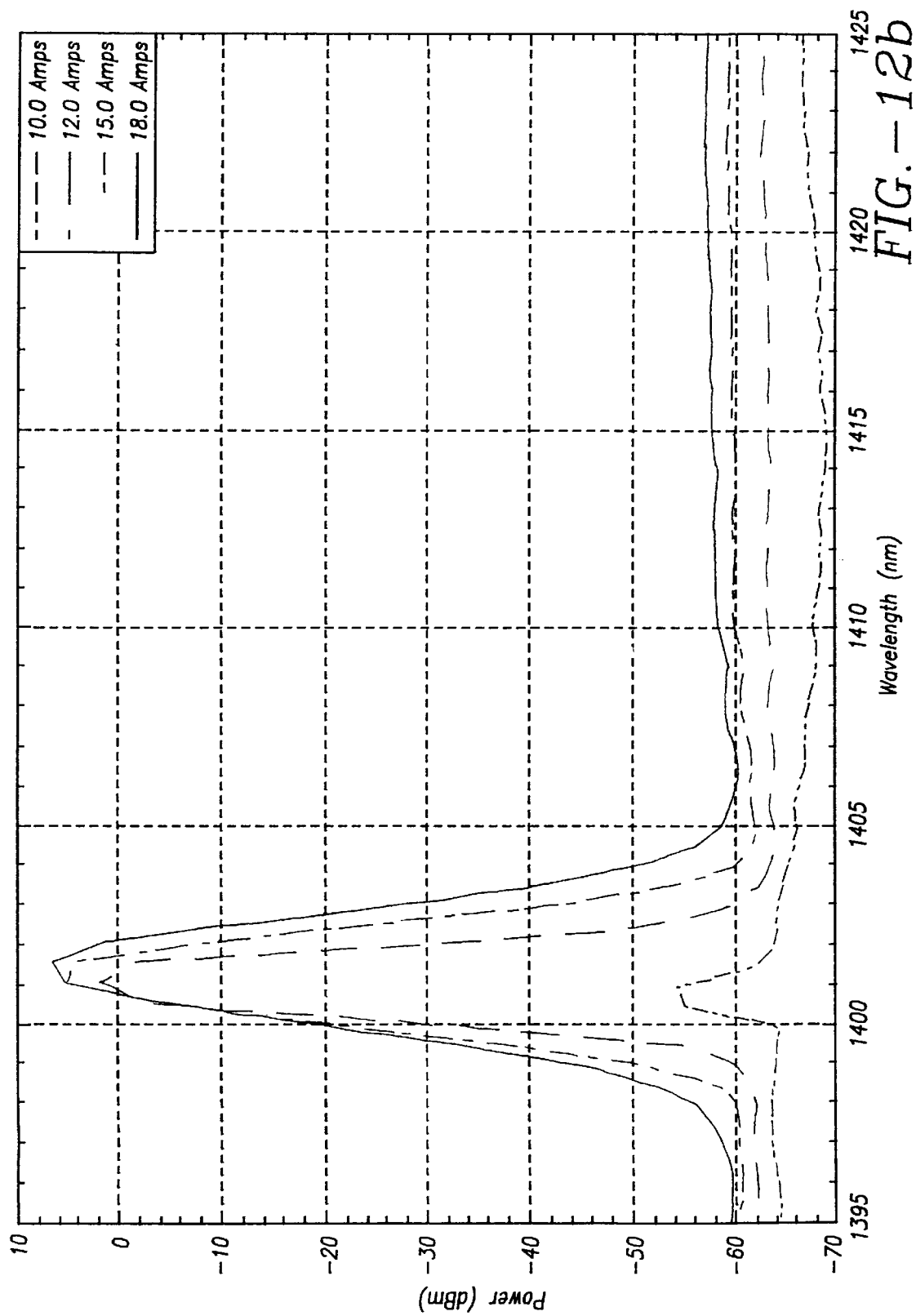
FIG. 12b depicts an output spectrum at different drive currents of the pump laser from a Raman oscillator with the grating operated near 1400 nm.
Figure 13A:
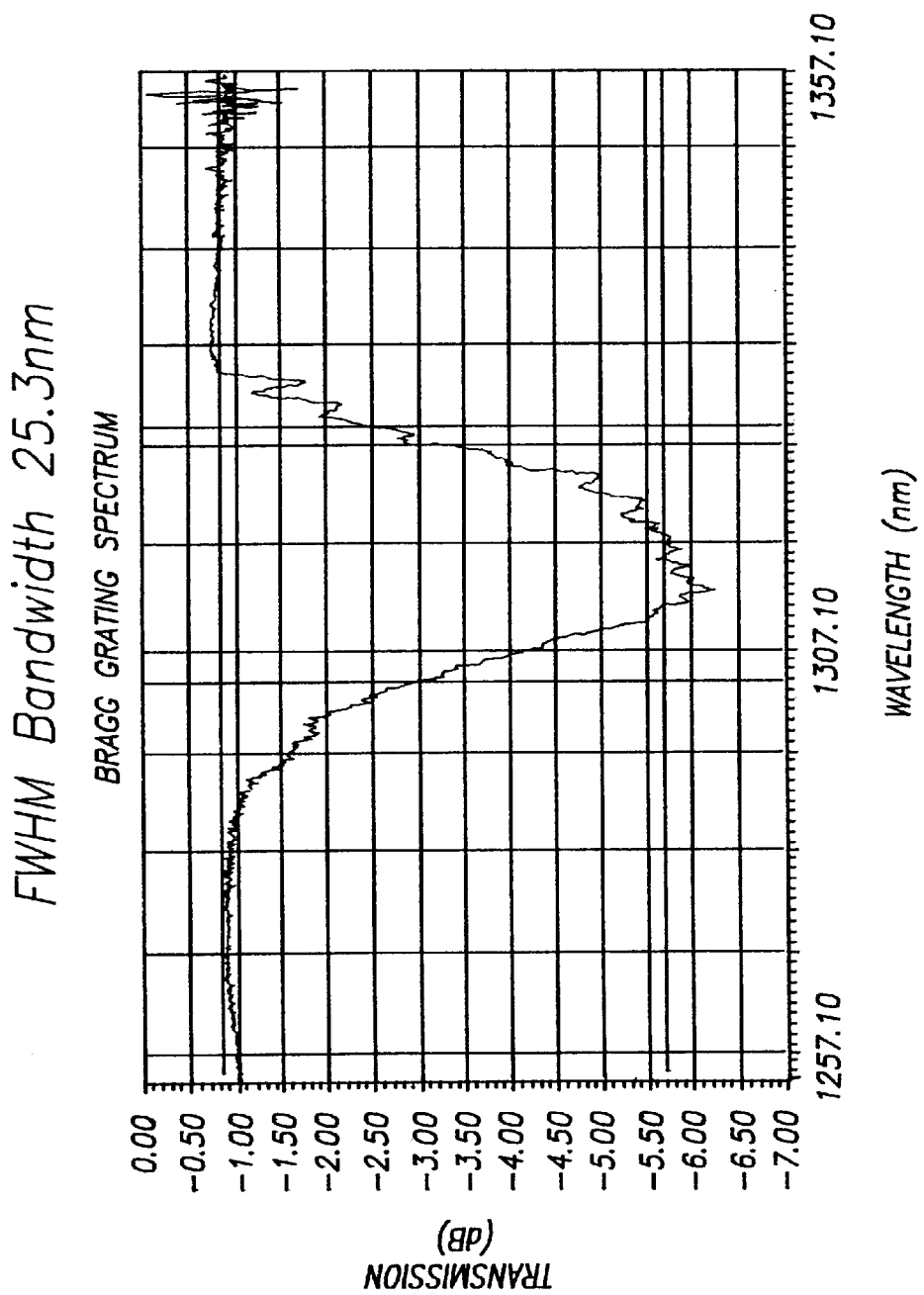
FIG. 13a depicts a broadband Bragg grating spectrum having a bandwidth of 25.3 nm.
Figure 13B:
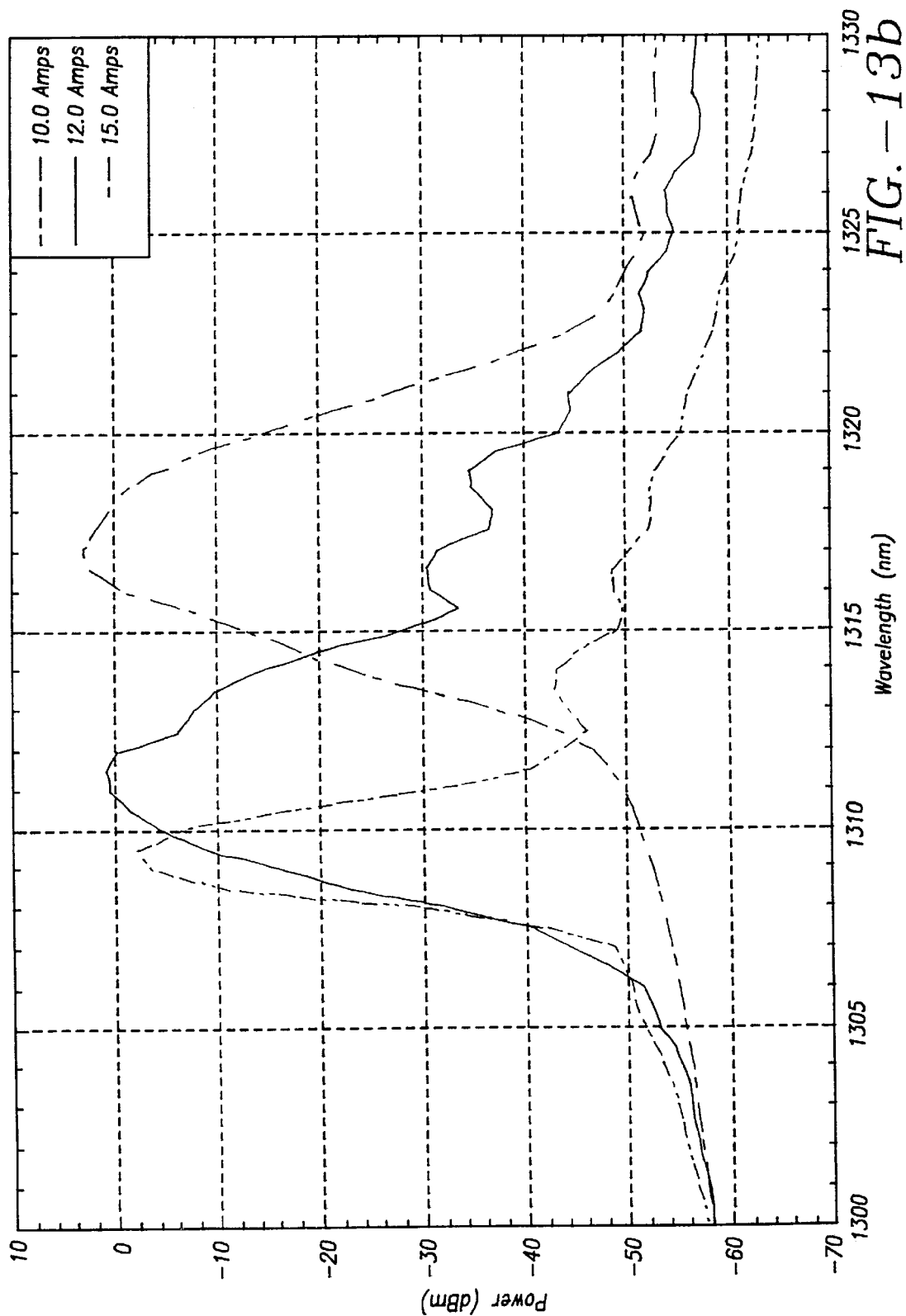
FIG. 13b depicts an output spectrum at different drive currents for the pump laser from a Raman oscillator with the gating operated near 1310 nm.

To illustrate the broader output bandwidth possible, experiments were conducted using the oscillator configuration of FIG. 10d. For these experiments, the pump was brought in through the Bragg grating end of the cavity instead of using a discrete WDM and the output signal was obtained from a 1% coupler in the cavity instead of a WDM. Two cases were studied: (a) narrowband grating for a 1400 nm oscillator, and (b) broadband grating for a 1310 nm oscillator. Note that the different wavelengths correspond to different cascade Raman orders. The difference is a consequence of the gratings available, and the same conclusion would result if they were at the same cascade order. FIG. 12a shows the reflection spectrum of the narrowband grating, which has a bandwidth of 0.44 nm. The output of the oscillator at different pump drive currents is shown in FIG. 12b, and the bandwidth of the output remains narrow even as the pump power is increased. This results because the gratings limit the bandwidth. On the other hand, FIG. 13a shows the reflection spectrum of the broadband grating, which has a bandwidth of 25.3 nm. As shown in FIG. 13b, now the bandwidth of the oscillator increases significantly as the pump power is increased. The peak wavelength also shifts to longer wavelengths with higher power, primarily because the Raman effect over the broad spectrum is depleting the higher-energy short wavelength side to pump the lower-energy long wavelength side. As mentioned above, the laser output broadens due to nonlinear processes in the gain fiber including four-wave mixing and Brillouin scattering.

7. Multiple-Pump Amplifier Bandwidth Enhancement Technique

While the previous section describes techniques to produce a broadband of wavelengths by a Raman oscillator, this section explores generation of multiple narrow-wavelength-band outputs (1–3 nm) from a single pump wavelength. These wavelength bands can have nearly arbitrary wavelength spacings and relative output powers. It is found that the details of fiber nonlinearities other than Raman gain are much less important and thus stable and reproducible output spectra can be obtained. This, in turn, allows the gain spectrum of a Raman amplifier to be controlled and its bandwidth to be increased.

To illustrate the technique, FIGS. 10d, 11a and, more explicitly, 11c are used here. The basic idea is to use two (or more) output coupler gratings where the reflectivity of the two output couplers is selected so that the shorter of the two desired output wavelengths reaches threshold first. Then as the power at this shorter wavelength increases, it acts as a Raman pump for the longer wavelength. This eventually causes the longer wavelength to reach threshold and then increase in power. This power increase, in turn, begins to suppress the output power at the shorter wavelength.

A multiple-output-wavelength Raman oscillator according to this invention comprises an oscillator cavity having a Raman gain medium therein and output couplers as one end of the cavity formed by a plurality of gratings. Each of the grating has a reflectivity less than 98%. It is characterized in that the reflectivities of the output couplers are chosen such that the cavity oscillation thresholds are reached with an increasing pump power in an order of grating center wavelength with the shortest wavelength reaching threshold first and the longest wavelength reaching threshold last; and an optical frequency difference between a grating with the shortest center wavelength and a grating with the longest wavelength is less than an optical frequency difference between an Raman pump source and the peak of the Raman gain for said Raman pump source in the Raman gain medium. The Raman gain medium is preferred to be an optical fiber with a length greater than 100 m and less than 2000 m. It is also preferred that the Raman gain medium is a dispersion compensating optical fiber. The grating has a reflectivity between 5% and 40%. The pump power has a range of wavelengths within 950 nm to 1350 nm, and output wavelengths all fall within the range 1200 nm to 1500 nm.

Figure 14:
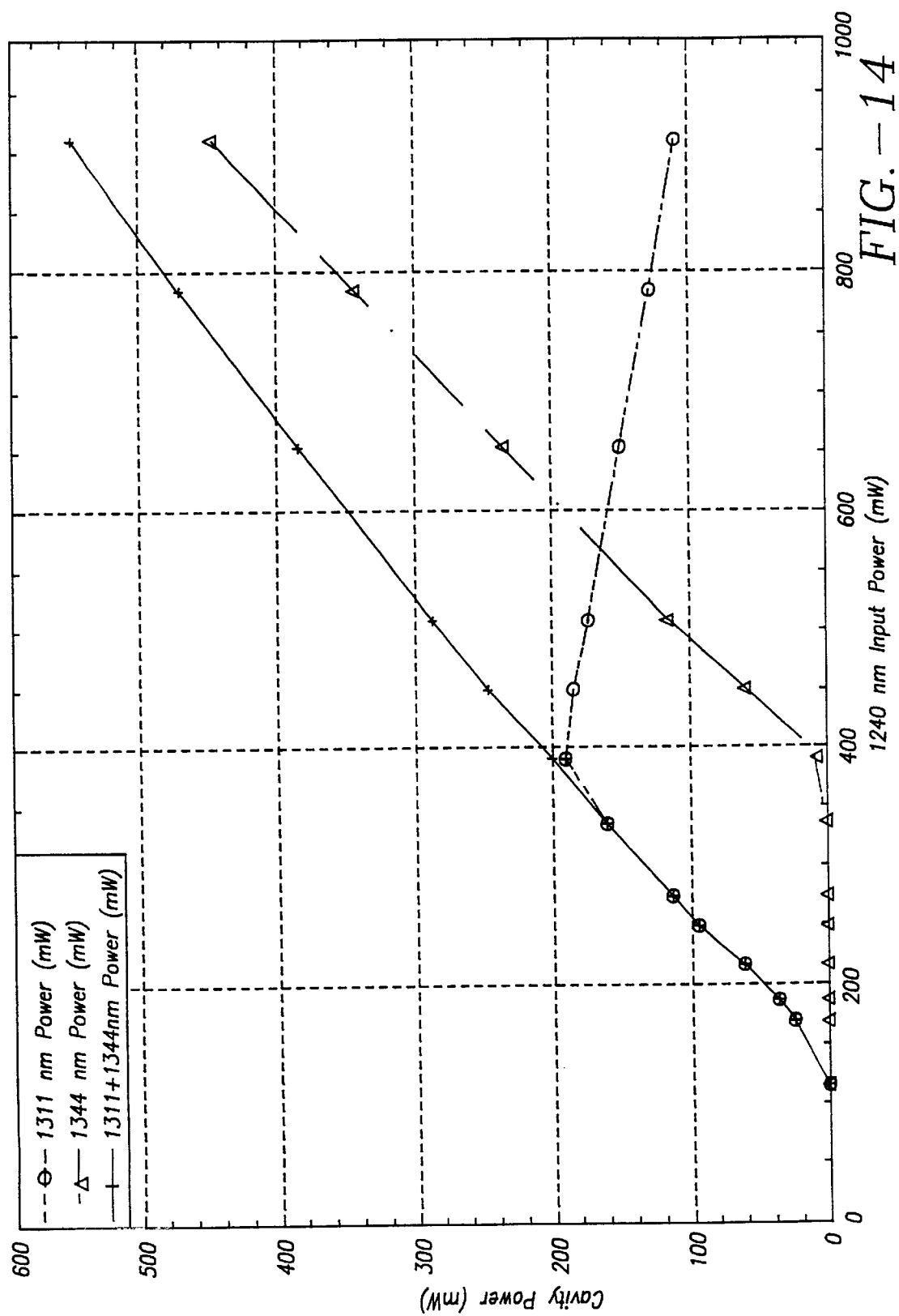
FIG. 14 depicts intra-cavity power levels observed in an experiment demonstrating the creation of light at 1311 nm and 1344 nm from a single pump at 1240 nm.
Figure 15:
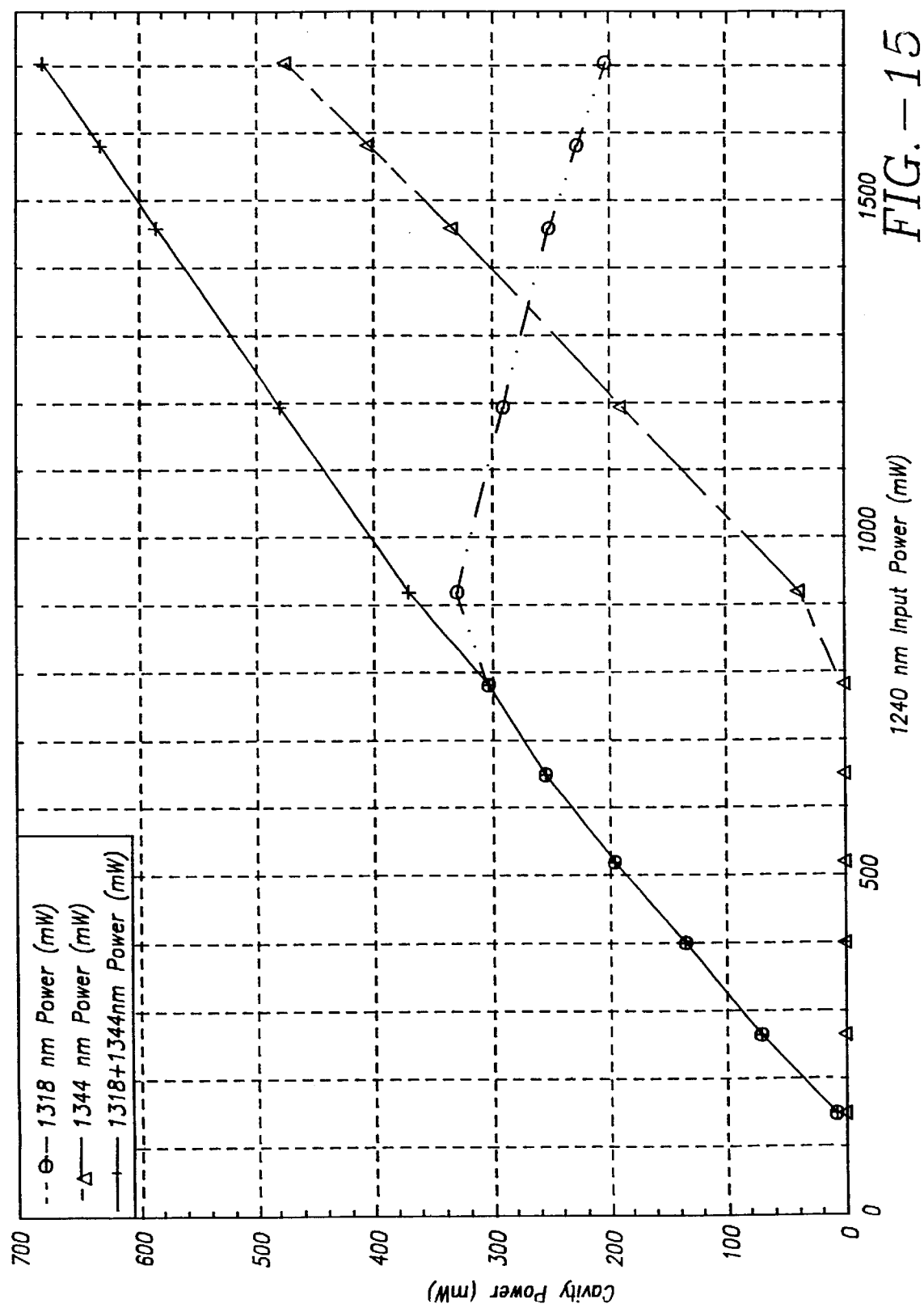
FIG. 15 depicts intra-cavity power levels observed in an experiment demonstrating the creation of light at 1318 nm and 1344 nm from a single pump at 1240 nm.

FIGS. 14 and 15 illustrate this behavior experimentally by showing the output power vs. pump input power at 1240 nm for two sets of cavity output wavelengths. The cavity configuration used for these experiments was that of FIG. 11a except a 1% coupler was added between the Bragg gratings and the Raman gain fiber to monitor the power in the cavity. The qualitative behavior in both cases are very similar. The shorter wavelength (1311 nm for FIG. 14 and 1318 nm for FIG. 15) output reached threshold first and increased in power until the longer wavelength (1344 nm) reached threshold. As the longer wavelength power increased, power at the shorter wavelength gradually decreased. The quantitative differences are due primarily to the different lengths of dispersion-shifted single-mode fiber used as the Raman gain fiber. The FIG. 14 experiment used a 2.2 km gain fiber, while the FIG. 15 experiment used a 4.3 km fiber.

Figure 16:
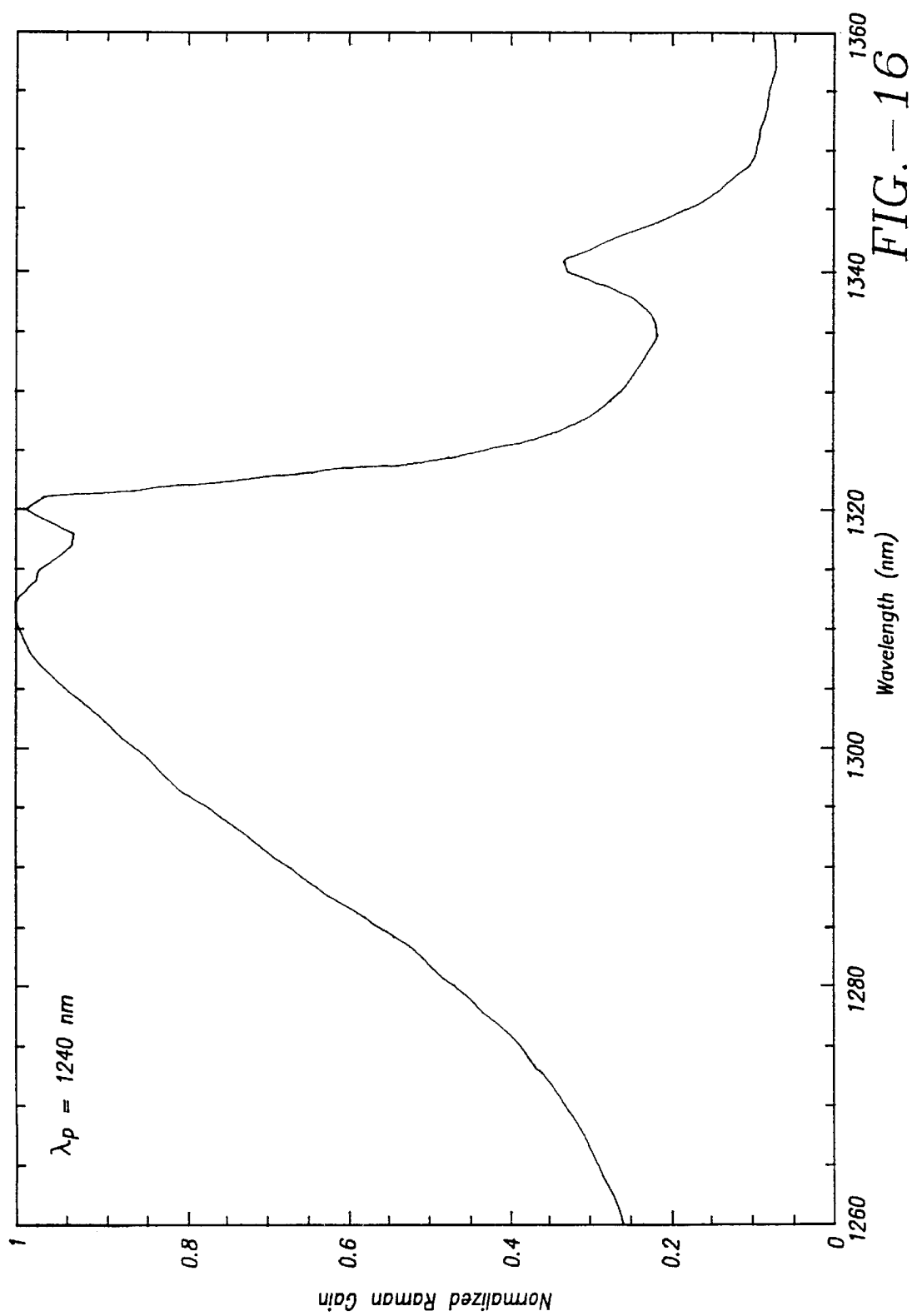
FIG. 16 depicts a normalized Raman-gain spectrum of a fused silica fiber for a pump wavelength of 1240 nm.

FIG. 16, which is the normalized Raman gain spectrum of a typical single-mode glass fiber with a pump wavelength of 1240 nm, shows the relative Raman gain for the wavelengths sets used above. The 1240 to 1311 nm gain coefficient (0.998) was 4.6 times as large as 1240 to 1344 nm (0.215) and 3.1 times as large as 1311 to 1344 nm (0.324). Likewise, the 1240 to 1318 nm gain coefficient (0.927) was 4.3 times as large as 1240 to 1344 nm (0.215) and 3.4 times as large as 1318 to 1344 nm (0.269). In both cases, the 1240 nm pump was strongly coupled to the shorter wavelength output and weakly coupled to the longer wavelength output. The system was strongly biased toward lasing at the shorter wavelength, even though the grating reflectivities at the two output wavelengths were approximately equal (®>99% @1311 nm, R=80% @1318 nm, and R=92% @1344 nm).

Given the qualitative output behavior displayed in FIGS. 14 and 15, and assuming that the trend continues such that the shorter wavelength output power returns to zero at some high pump power, it is obvious that all output power ratios are achieved for some input pump power. This observation combined with the fact that the lasing thresholds of the two output wavelengths can be independently controlled through the selection of the grating output coupling reflectivities means that any desired combination of output powers can be obtained if sufficient pump power is available.

Figure 17:
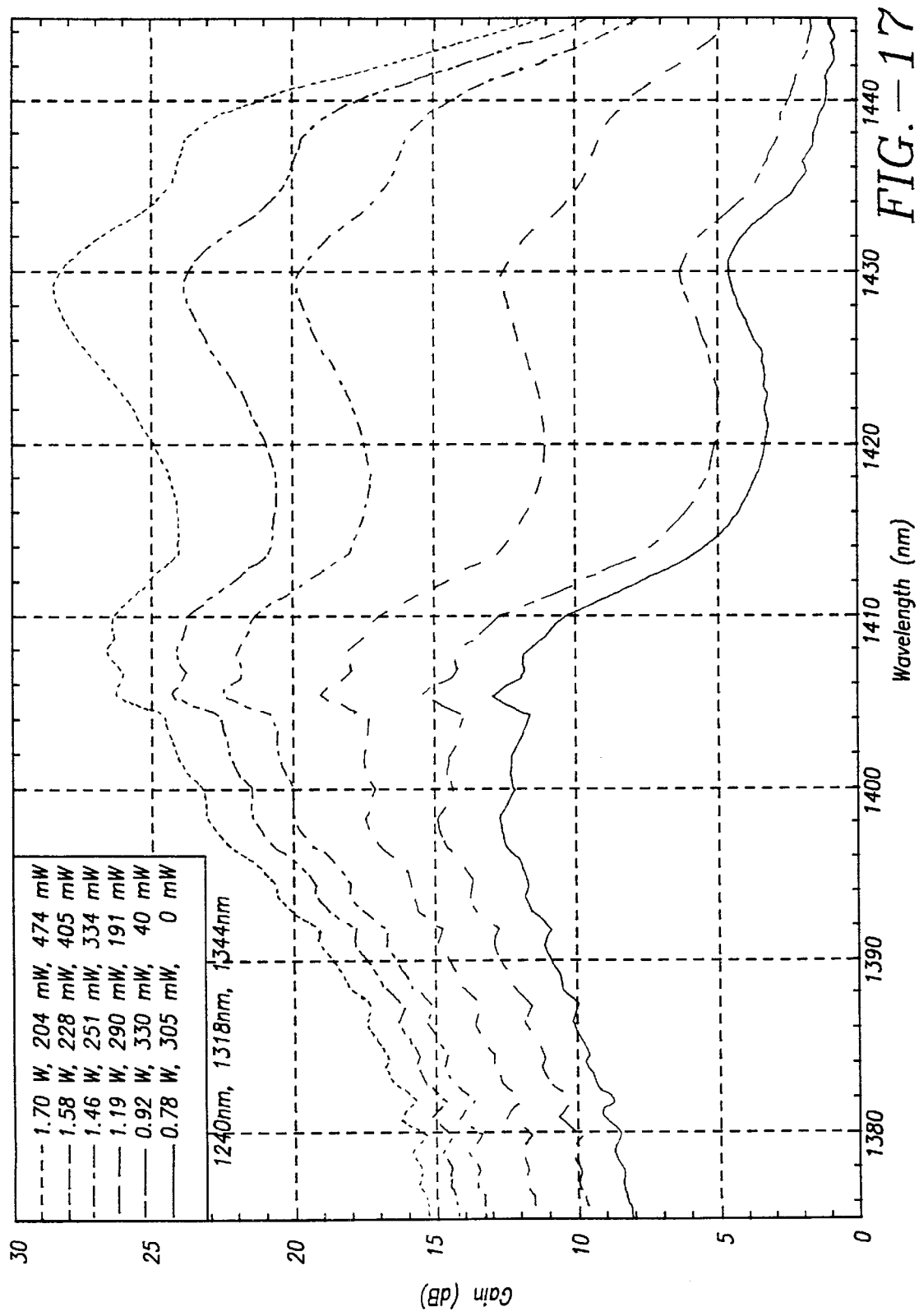
FIG. 17 depicts Raman-gain spectra associated with several of the power levels shown in FIG. 15 and taken simultaneously with the power measurements.

This freedom can be used in accordance with the inventions contained herein to maximize the gain bandwidth of a Raman amplifier. FIG. 17 shows the Raman gain vs. wavelength at several pump input powers for the same experimental setup used to generate FIG. 15. While a signal could have been injected and removed from the WDM port labeled signal out in FIG. 11a, an adequate light source was not available. The gain curves were therefore computed from amplified spontaneous emission measurements. This required some assumptions that may have lead to minor quantitative errors especially at small gain levels, but should not have affected the qualitative results.

Those results reflect the fact that the lowest two pump input power levels essentially correspond to single pump Raman gain curves, since only the shorter 1318 nm wavelength has any significant power. Power at the longer 1344 nm output wavelength increases with increasing pump input power as does the amplifier bandwidth, until the flattest gain spectrum was achieved at the second highest input pump power plotted.

Figure 18:
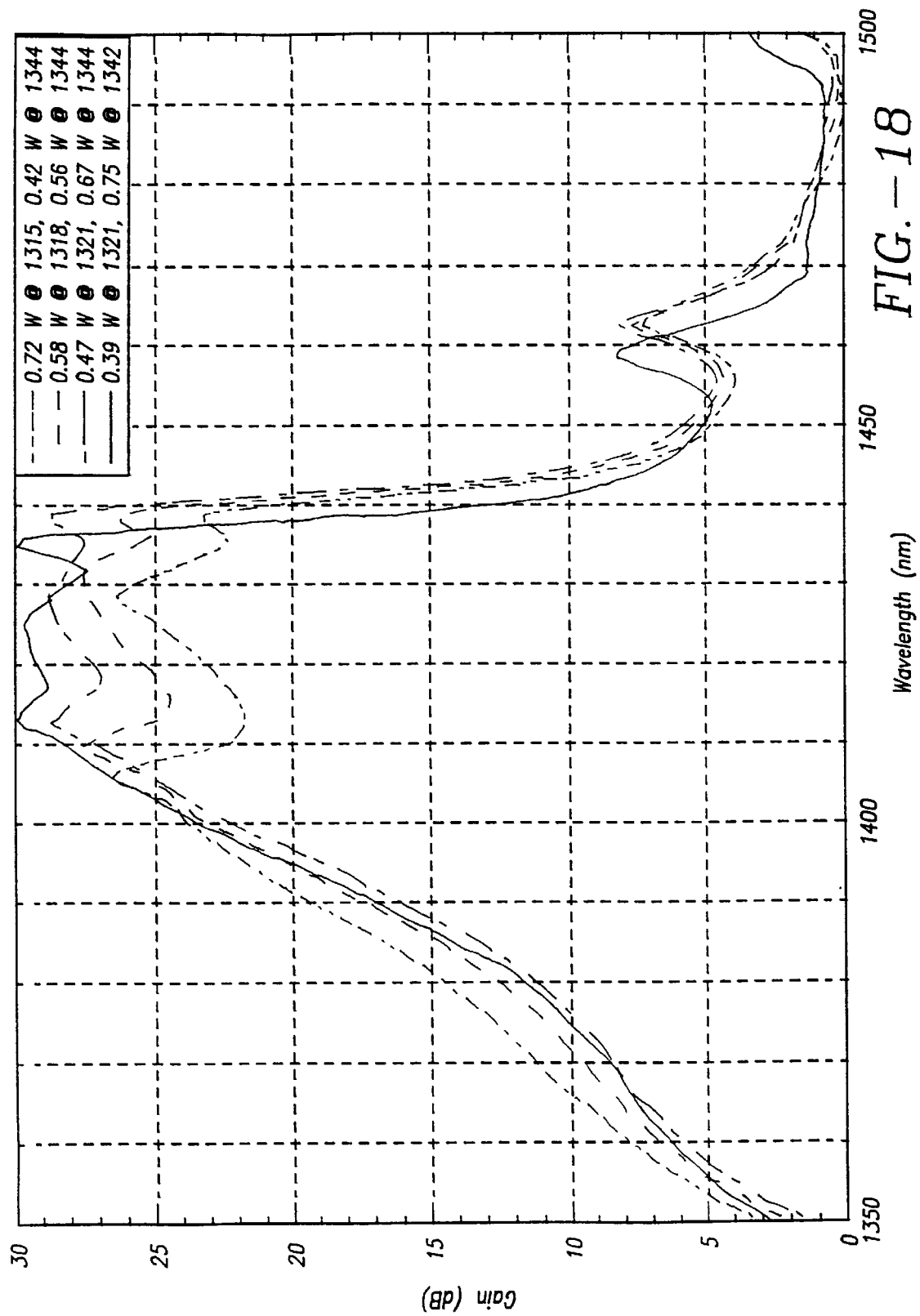
FIG. 18 depicts theoretical Raman amplifier gain curves at various pump wavelength spacings.

While the experimental example of FIG. 17 clearly shows the increase in bandwidth achievable with two pump wavelengths instead of one, the wavelength spacing was not optimal (due to lack of parts for the optimal configuration) in terms of gain flatness. FIG. 18 shows simulations of the effect of different wavelength spacings on otherwise optimally flat Raman gain curves in silica fibers. It can be seen that pump wavelengths of 1321 nm and 1344 nm would have generated flatter gain spectra had they been used. This result can be extended to other wavelengths by using an energy separation of 3.89 THz between the two pump wavelengths.

8. Low Frequency Pump Noise Reduction Technique

As described earlier, counter-propagating of the pump and signal to be amplified averages the Raman gain variations due to pump fluctuations over the signal transit time of the amplifier. This time averaging acts as high-frequency blocking filter, effectively suppressing pump fluctuations which have frequencies much larger than 1/amplifier transit time. However, lower frequency pump fluctuations are not completely suppressed by this averaging. Since it is also desirable to reduce the effect of low frequency pump fluctuations, a technique for doing so is described below.

The technique requires that the allowed cavity modes of the oscillator or amplifier be modified by adding a intracavity periodic filter element such as the Fabry-Perot filter. The allowed cavity modes in a ring configuration have a frequency spacing given by v/L, where L is the total length of fiber comprising the ring cavity and v is the velocity of light in that fiber. Light passes the length of fiber comprising a linear cavity twice per round trip, and thus its allowed-mode frequency spacing is given by v/2L. For a linear cavity where $v=2\times10^8$ and L=1 km, the allowed-mode frequency spacing is thus 100 KHz. Large pump fluctuations will typically be observed at integer multiples of this fundamental cavity frequency. The purpose of adding a periodic filter element is to increase the spacing of the allowed cavity modes and thus increase the lowest frequency where large pump fluctuations occur. This increased frequency, in turn, can be suppressed more completely by simply using a counter-propagating pump and signal geometry.

The Brillouin gain linewidth of the fiber used sets a practical upper bound on the allowed-cavity-mode spacing. For cavity mode spacings exceeding this linewidth and given a constant pump-spectral linewidth, Brillouin gain is enhanced by approximately a factor of the cavity-mode spacing divided by the Brillouin linewidth. This increased Brillouin gain eventually reduces the device operating efficiency. The Brillouin linewidth varies with fiber type but is typically in the range 10–100 MHz. For a Fabry-Perot filter, the length of fiber between partial reflectors such as Bragg gratings would be 1–10 meters. If this type of filter is used as an output coupler in a Raman oscillator configuration which already uses a single grating output coupler, only one additional Bragg grating would need to be used to control the allowed-mode spacing of the output light.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. A circulator loop cavity, comprising:
   an optical circulator having a first port, a second port and a third port;
   a gain medium connected between said second port and said third port for producing gain to an optical signal therein;
   a coupler that couples a pump beam to said gain medium to pump said gain medium; and
   a plurality of gratings coupled to the second port that provide cavity wavelength control.

2. The circulator loop cavity according to claim 1, wherein said optical circulator comprises two optical isolators connected in series.

3. The circulator loop cavity according to claim 1, wherein said circulator loop cavity is configured as a circulator loop cavity oscillator, and further comprises an output port for outputting said optical signal.

4. The circulator loop cavity according to claim 3, wherein said gain medium is a Raman optical fiber.

5. The circulator loop cavity according to claim 4, wherein said coupler is a WDM connected to said gain medium which couples over said pump beam wavelength and passes therein cascade Raman orders and said signal wavelengths.

6. The circulator loop cavity according to claim 4, wherein said output port is a WDM which partially couples over said signal wavelength and passes therein cascade Raman orders and said pump beam wavelengths.

7. The circulator loop cavity according to claim 1, wherein said circulator loop cavity is configured as a circulator loop cavity amplifier, and further comprises an input port and an output port for introducing and outputting said optical signal respectively such that said optical signal travels in a first direction along said gain medium, and said pump light travels along said gain medium in a direction opposite to said first direction.

8. The circulator loop cavity according to claim 7, wherein said gain medium is a Raman optical fiber.

9. The circulator loop cavity according to claim 8, wherein said coupler means is a WDM connected to said gain medium which couples over said pump beam wavelength and passes therein cascade Raman orders and said signal wavelengths.

10. The circulator loop cavity according to claim 8, wherein said input port and said output port are WDMs, each of which couples over said signal wavelength and passes therein cascade Raman orders and said pump beam wavelengths.

11. The circulator loop cavity according to claim 8, wherein said Raman optical fiber is about 500 m and has a high germanium content, large core-cladding index difference and small effective area.

12. A circulator loop cavity amplifier comprising:
    an input port for introducing an optical signal to be amplified;
    a circulator loop cavity including:
    an optical circulator having a first port, a second port and a third port; and
    a gain medium connected between said first port and said third port for producing gain to said optical signal therein;
    a Sagnac Raman loop mirror comprising an amplifying fiber having its two ends connected to a coupler;
    a coupler for coupling a pump beam to said gain medium to pump said gain medium; and
    an output port for outputting said optical signal from said gain medium, wherein said optical signal travels in a first direction along said gain medium, and said pump light travels along said gain medium in a direction opposite to said first direction.

13. The circulator loop cavity amplifier according to claim 12, wherein said circulator comprises two optical isolators connected in series.

14. The circulator loop cavity amplifier according to claim 12, wherein said gain medium is a Raman optical fiber.

15. The circulator loop cavity amplifier according to claim 14, wherein said coupler is WDM which couples over said pump beam wavelength and passes therein cascade Raman orders and said signal wavelengths.

16. The circulator loop cavity amplifier according to claim 14, wherein said input port and output port are WDMs, each of which couples over said signal wavelength and passes therein cascade Raman orders and said pump beam wavelengths.

17. The circulator loop cavity amplifier according to claim 12, wherein said coupler is connected between said first port of said circulator and said Sagnac Raman loop mirror.

18. The circulator loop cavity Raman amplifier according to claim 12, wherein said coupler has a coupling ratio of 50:50.

19. A circulator loop cavity, comprising:
    an optical circulator having a first port, a second port and a third port;
    a gain medium connected between said first port and said third port for producing gain to an optical signal therein;
    a coupler for coupling a pump beam to said gain medium to pump said gain medium; and
    a broadband reflector connected to said second port for providing cavity wavelength control.

20. The circulator loop cavity according to claim 19, wherein said optical circulator comprises two optical isolators connected in series.

21. The circulator loop cavity according to claim 19, wherein said broadband reflector comprises a dielectric filter.

22. The circulator loop cavity according to claim 19, wherein said broadband reflector comprises a chirped Bragg grating.

23. The circulator loop cavity according to claim 22, wherein said chirped Bragg grating has a uniformly varied period.

24. The circulator loop cavity according to claim 22, wherein said chirped Bragg grating has a step-wise period.

25. The circulator loop cavity according to claim 19, wherein said circulator loop cavity is configured as a circulator loop cavity oscillator, and further comprises an output port for outputting said optical signal.

26. The circulator loop cavity according to claim 25, wherein said gain medium is a Raman optical fiber.

27. The circulator loop cavity according to claim 26, wherein said broadband reflector comprises a plurality of chirped Bragg gratings, and each grating is for one cascade Raman order.

28. The circulator loop cavity according to claim 19, wherein said circulator loop cavity is configured as a circulator loop cavity amplifier, and further comprises an input port and an output port for introducing and outputting said optical signal respectively such that said optical signal travels in a first direction along said gain medium, and said pump light travels along said gain medium in a direction opposite to said first direction.

29. The circulator loop cavity according to claim 28, wherein said gain medium is a Raman optical fiber.

30. The circulator loop cavity according to claim 29, wherein said broadband reflector comprises a plurality of chirped Bragg gratings, and each grating is for one cascade Raman order.

31. A circulator loop cavity amplifier, comprising:
a first optical circulator having a first port, a second port and a third port;
a first gain medium connected to said second port of said circulator;
a second gain medium connected to said first gain medium at a joint;
a means for connecting said second gain medium to said third port of said circulator;
means for introducing and removing an optical signal at said joint such that said optical signal travels in sequence through said first gain medium, said second port, said third port, said connecting means, and said second gain medium;
an optical connection between said connecting means and said first port of said circulator; and
a coupling means connected to said first port of said circulator for coupling a pump beam to pump said first and second gain mediums, wherein said pump beam travels in sequence through said first port, said second port, said first gain medium, said second gain medium, said connecting means, and said optical connection.

32. The circulator loop cavity amplifier according to claim 31, wherein said optical connection is an optical fiber.

33. The circulator loop cavity amplifier according to claim 31, wherein said connecting means is a WDM.

34. The circulator loop cavity amplifier according to claim 31, wherein each of said first and second gain media is a Raman optical fiber.

35. The circulator loop cavity amplifier according to claim 34, wherein said optical connection comprises:
a second optical circulator having a first port connected to said connecting means and a third port connected to said first port of said first circulator; and
a plurality of chirped Bragg gratings connected to a second port of said second circulator, each of said chirped Bragg grating being used for one cascade Raman order.

36. The circulator loop cavity amplifier according to claim 35, wherein said chirped Bragg grating has a uniform period.

37. The circulator loop cavity amplifier according to claim 35, wherein said chirped Bragg grating has a step-wise period.

38. A Sagnac Raman cavity, comprising:
a Sagnac loop mirror comprising a Raman gain medium and a coupler connected thereto, said Raman gain medium producing gain to an optical signal therein;
a plurality of chirped Bragg gratings, each of said chirped Bragg grating being used for one cascade Raman order; and
a coupling means for coupling a pump beam to said Raman gain medium to pump said Raman gain medium.

39. The Sagnac Raman cavity according to claim 38, further comprising a polarization controller.

40. The Sagnac Raman cavity according to claim 38, wherein said chirped Bragg grating has a uniformly varied period.

41. The Sagnac Raman cavity according to claim 38, wherein said chirped Bragg grating has a step-wise period.

42. The Sagnac Raman cavity according to claim 38, wherein said coupling means is located between said Sagnac loop mirror and said chirped Bragg gratings.

43. The Sagnac Raman cavity according to claim 38, wherein said Sagnac Raman cavity is configured as a Sagnac Raman cavity oscillator, and further comprises an output port for outputting said optical signal.

44. The Sagnac Raman cavity according to claim 38, wherein said Sagnac Raman cavity is configured as a Sagnac Raman cavity amplifier, and further comprises an input port and an output port for introducing and removing said optical signal.

45. A linear Raman cavity, comprising:
a plurality of chirped Bragg gratings;
a broadband reflector for reflecting at least two cascade Raman orders;
a Raman gain medium positioned therebetween for producing gain to an optical signal therein, each of said chirped Bragg grating being used for one cascade Raman order; and
a coupling means for coupling a pump beam to said Raman gain medium to pump said Raman gain medium.

46. The linear Raman cavity according to claim 45, wherein at least a portion of said plurality of chirped Bragg grating have a uniformly varied period.

47. The linear Raman cavity according to claim 45, wherein at least a portion of said plurality of chirped Bragg grating have a step-wise period.

48. The linear Raman cavity according to claim 45, wherein said broadband reflector is a loop mirror.

49. The linear Raman cavity according to claim 45, wherein said broadband reflector is a gold coated fiber end.

50. The linear Raman cavity according to claim 45, wherein said broadband reflector is a dielectric coated fiber end.

51. The linear Raman cavity according to claim 45, wherein said Raman gain medium is an optical fiber having a length of 1 km or less.

52. The linear Raman cavity according to claim 45, wherein said Raman gain medium is a dispersion compensating optical fiber.

53. The linear Raman cavity according to claim 45, wherein said linear Raman cavity is configured as a linear Raman cavity oscillator, and further comprises an output port for outputting said optical signal.

54. The linear Raman cavity according to claim 45, wherein said linear Raman cavity is configured as a linear Raman cavity amplifier, and further comprises an input port and an output port for introducing and removing said optical signal.

55. A linear Raman cavity oscillator, comprising:
a group of gratings;
a broadband reflector for reflecting at least two cascade Raman orders;
a Raman gain medium positioned therebetween to form a cavity for producing gain to an optical signal through cascade Raman amplification, wherein each of said gratings is used for one cascade Raman order; and a coupling means located outside said cavity for coupling a pump beam to pump said Raman gain medium and outputting said optical signal.

56. The linear Raman cavity oscillator according to claim 55, wherein said linear Raman cavity is formed from a single continuous length of optical fiber.

57. The linear Raman cavity oscillator according to claim 55, wherein said grating is a Bragg grating, and said broadband reflector is a Sagnac loop mirror.

58. The linear Raman cavity oscillator according to claim 55, wherein said broadband reflector is a gold coated fiber end.

59. The linear Raman cavity oscillator according to claim 55, wherein said broadband reflector is a dielectric coated fiber end.

60. The linear Raman cavity oscillator according to claim 55, wherein said Raman gain medium is an optical fiber having a length of 1 km or less.

61. The linear Raman cavity oscillator according to claim 55, wherein said Raman gain medium is a dispersion compensating optical fiber.

62. The linear Raman cavity oscillator according to claim 55, wherein at least one of said gratings has a reflectivity in a range of about 5–40%.

63. The linear Raman cavity oscillator according to claim 55, wherein said coupling means comprises an optical circulator.

64. The linear Raman cavity oscillator according to claim 55, wherein said coupling means comprises a WDM.

65. The linear Raman cavity oscillator according to claim 55, wherein said coupling means comprises an optical power splitter.

66. The linear Raman cavity oscillator according to claim 55, further comprising a broadband grating at the same side of said gratings, wherein each of said gratings is used for one intermediate cascade Raman order and said broadband grating is used for the final Raman order.

67. The linear Raman cavity oscillator according to claim 66, wherein said broadband grating has a reflecting bandwidth greater than 5 nm.

68. The linear Raman cavity oscillator according to claim 66, wherein said broadband grating is partially reflecting.

69. The linear Raman cavity oscillator according to claim 55, further comprising a second group of gratings at the same side of said gratings, wherein each of said first group of gratings is used for one intermediate cascade Raman order and each of said second group of gratings is used for a discrete wavelength range within the final Raman order.

70. The linear Raman cavity oscillator according to claim 69, wherein each of said second group of gratings has a center frequency less than 8 THz apart from each of other gratings in said second group.

71. A linear Raman cavity oscillator, comprising:
a multi-stack dielectric mirror having a plurality of dielectric layers;
a broadband reflector;
a Raman gain medium positioned therebetween to form a cavity for producing gain to an optical signal through cascade Raman amplification, wherein each of said dielectric layer reflects at one cascade Raman order;
a coupling means located inside said cavity for coupling a pump beam to pump said Raman gain medium; and
an output port for outputting said optical signal.

72. The linear Raman cavity oscillator according to claim 71, further comprising a collimating means before said multi-stack dielectric mirror.

73. The linear Raman cavity oscillator according to claim 72, wherein said collimating means is a lens.

74. A multiple-output-wavelength Raman oscillator, comprising:
an oscillator cavity having a Raman gain medium therein; and
output couplers at one end of said cavity formed by a plurality of gratings, each of said gratings having a reflectivity less than 98%, characterized in that:
the reflectivities of said output couplers are chosen such that said cavity oscillation thresholds are reached with an increasing pump power in an order of grating center wavelength with the shortest wavelength reaching threshold first and the longest wavelength reaching threshold last; and
an optical frequency difference between a grating with the shortest center wavelength and a grating with the longest wavelength is less than an optical frequency difference between an Raman pump source and the peak of the Raman gain for said Raman pump source in said Raman gain medium.

75. The multiple-output-wavelength Raman oscillator according to claim 74, wherein said Raman gain medium is an optical fiber with a length greater than 100 m and less than 2000 m.

76. The multiple-output-wavelength Raman oscillator according to claim 74, wherein said Raman gain medium is a dispersion compensating optical fiber.

77. The multiple-output-wavelength Raman oscillator according to claim 74, wherein said grating have a reflectivity between 5% and 40%.

78. The multiple-output-wavelength Raman oscillator according to claim 74, wherein said pump power has a range of wavelengths within 950 nm to 1350 nm, and output wavelengths all fall within the range 1200 nm to 1500 nm.

79. A linear Raman cavity oscillator, comprising:
a plurality of gratings;
a broadband reflector for substantially reflecting at least two cascade Raman orders;
a Raman gain medium positioned therebetween to form an optical cavity and produce gain in an optical signal; and
a coupler for coupling a pump beam to pump said Raman gain medium;
wherein said coupler couples the pump beam to pump said Raman gain medium and outputs said optical signal.

80. A linear Raman cavity oscillator, comprising:
a plurality of gratings;
a broadband reflector for substantially reflecting at least two cascade Raman orders;
a Raman gain medium positioned therebetween to form an optical cavity and produce gain in an optical signal; and
a coupler for coupling a pump beam to pump said Raman gain medium;
wherein said coupler is a wavelength division multiplexing coupler that couples the pump beam to pump said Raman gain medium and outputs said optical signal.

* * * * *

UNITED STATES PATENT AND TRADEMARK OFFICE
CERTIFICATE OF CORRECTION

PATENT NO.      : 6,374,006 B1
DATED           : April 16, 2002
INVENTOR(S)     : Mohammed N. Islam et al.

It is certified that error appears in the above-identified patent and that said Letters Patent is hereby corrected as shown below:

<u>Title page,</u>
Item [73], Assignee, after "Xtera Communications, Inc., Allen, TX (US)", insert
-- The Regents of the University of Michigan, Ann Arbor, MI (US) --

Signed and Sealed this

Twentieth Day of May, 2003

JAMES E. ROGAN
*Director of the United States Patent and Trademark Office*